US012508814B2

(12) United States Patent
Hanba

(10) Patent No.: US 12,508,814 B2
(45) Date of Patent: Dec. 30, 2025

(54) LIQUID CONTAINER AND METHOD FOR REUSING LIQUID CONTAINER

(71) Applicant: SEIKO EPSON CORPORATION, Tokyo (JP)

(72) Inventor: Hiroto Hanba, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 149 days.

(21) Appl. No.: 18/619,965

(22) Filed: Mar. 28, 2024

(65) Prior Publication Data

US 2024/0326456 A1 Oct. 3, 2024

(30) Foreign Application Priority Data

Mar. 29, 2023 (JP) ................................ 2023-052911

(51) Int. Cl.
*B41J 2/175* (2006.01)

(52) U.S. Cl.
CPC ....... *B41J 2/17543* (2013.01); *B41J 2/17523* (2013.01); *B41J 2/17553* (2013.01)

(58) Field of Classification Search
CPC ......................... B41J 2/17513; B41J 2/17523; B41J 2/17543; B41J 2/17553; B41J 2002/17516
See application file for complete search history.

(56) References Cited

U.S. PATENT DOCUMENTS 7,216,802 B1 * 5/2007 De La Huerga ... G07C 9/00182 235/382
9,108,417 B2 8/2015 Aoki et al.
10,399,050 B1 * 9/2019 Bertsch ................ A47J 43/042
2003/0085968 A1 * 5/2003 Shimizu ............... B41J 2/17523 347/86
2020/0113246 A1 * 4/2020 Barbaric ................ A24F 40/53

FOREIGN PATENT DOCUMENTS

JP 2012-140011 A 7/2012

* cited by examiner

*Primary Examiner* — Anh T Vo
(74) *Attorney, Agent, or Firm* — Oliff PLC

(57) ABSTRACT

A liquid container includes a liquid containing body that contains liquid, a case that houses the liquid containing body, and a display board portion on which identification information regarding the liquid container is gathered and displayed. The case has a mounting surface from which a supply portion through which the liquid in the liquid containing body is supplied is exposed. The display board portion is detachably provided on a surface region of the case that is different from the mounting surface.

11 Claims, 11 Drawing Sheets

LIQUID CONTAINER AND METHOD FOR REUSING LIQUID CONTAINER

The present application is based on, and claims priority from JP Application Serial Number 2023-052911, filed Mar. 29, 2023, the disclosure of which is hereby incorporated by reference herein in its entirety.

BACKGROUND

1. Technical Field

The present disclosure relates to a liquid container such as an ink cartridge that directly or indirectly contains liquid such as ink, and a method for reusing the liquid container.

2. Related Art

For example, JP-A-2012-140011 discloses an ink jet printing device (an example of a liquid ejecting device) that includes an ejection head that ejects liquid such as ink onto a medium such as paper. A liquid container such as an ink cartridge, which contains liquid (for example, ink) to be supplied to the ejection head, is detachably mounted on the liquid ejecting device. A label displaying identification information regarding the liquid such as ink is pasted to a case of the liquid container, or the identification information is directly recorded on the case.

However, in recent years, environmental problems such as global warming and depletion of subterranean resources have become serious, and there is a growing demand for a reduction in the amount of plastic used. Therefore, there is a need to reuse a plastic component such as a case component obtained by disassembling liquid containers such as previously used ink cartridges. However, a label displaying identification information is pasted to the case of the liquid container, or the identification information is directly recorded on the case. For this reason, when disposing of the liquid container as a valuable resource by recycling or the like, it is necessary to perform work of peeling off the label or erasing the recorded identification information. Therefore, it is desired to be able to reuse the plastic component such as the case while reducing a workload of peeling off the label or removing the recorded identification information. That is, it is desired to increase a proportion of a portion of the case of the liquid container that can be disposed of as a valuable resource while reducing the workload at the time of disposal.

SUMMARY

According to an aspect of the present disclosure, a liquid container includes: a liquid containing body containing liquid; a case housing the liquid containing body; and a display board portion on which identification information regarding the liquid container is gathered and displayed, in which the case has a mounting surface from which a supply portion through which the liquid in the liquid containing body is supplied is exposed, and the display board portion is detachably provided on a surface region different from the mounting surface of the case.

According to an aspect of the present disclosure, a method for reusing the liquid container includes: collecting the liquid container previously used in which the liquid in the liquid containing body housed in the case of which the display board portion is detachably provided on the surface region different from the mounting surface was used; removing the display board portion from the liquid container previously used; and reusing at least some components of the case from which the display board portion was removed and recycling a liquid container by detachably providing a display board portion that is new or recycled on a surface region of a case recycled by reusing the components.

DESCRIPTION OF EMBODIMENTS

Hereinafter, an embodiment of a liquid ejecting device including a liquid container will be described with reference to the drawings. The liquid ejecting device according to the present embodiment prints (records) characters, images, or the like on a medium such as paper by ejecting ink onto the medium.

Figure 1:
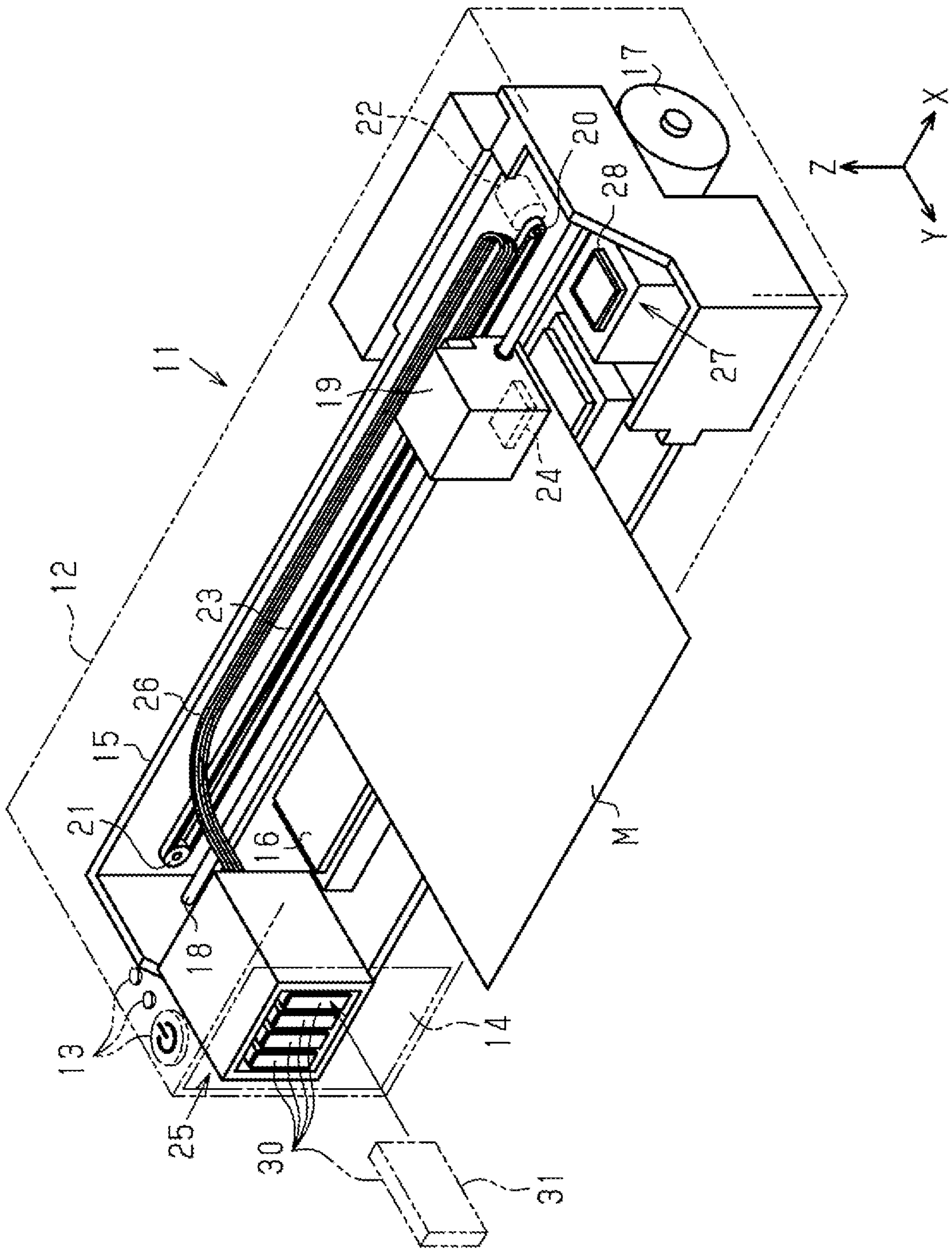
FIG. 1 is a perspective view illustrating a liquid ejecting device according to an embodiment.

In the present embodiment, directions are defined by an X-axis, a Y-axis, and a Z-axis illustrated in FIG. 1, the X-axis, the Y-axis, and the Z-axis intersecting one another (the X-axis, the Y-axis, and the Z-axis may be orthogonal to one another). In FIG. 1, a liquid ejecting device 11 is assumed to be placed on a horizontal plane, a direction along the Z-axis is illustrated as a Z direction, and directions along the horizontal plane are illustrated as an X direction and a Y direction. That is, the X direction, the Y direction, and the Z direction intersect one another (the X direction, the Y direction, and the Z direction may be orthogonal to one another). A vertically downward direction along the Z direction may be referred to as a −Z direction, and an upward direction along the Z direction may be referred to as a +Z direction. The X direction is also a width direction of a medium M that is a printing target in the liquid ejecting device 11. A right direction along the X direction may be referred to as a +X direction, and a left direction along the X direction may be referred to as a −X direction. Further, the Y direction is also a transport direction in which the medium M is transported in the liquid ejecting device 11. A front direction along the Y direction may be referred to as a +Y direction, and a rear direction along the Y direction may be referred to as a −Y direction. One end side in the Y direction is referred to as a front surface side or a front side, and the other end side opposite to the one end side is referred to as a back surface side or a rear side. Further, when the liquid ejecting device 11 is viewed from the front surface side, one end side in the X direction may be referred to as a right side, and the other end side may be referred to as a left side.

Configuration of Liquid Ejecting Device 11

Hereinafter, a liquid ejecting device that ejects liquid supplied from a liquid container containing ink as an example of the liquid by using the liquid container as a liquid supply source will be described with reference to the drawings.

As illustrated in FIG. 1, the liquid ejecting device 11 of the present embodiment is an ink jet printer that ejects the ink as an example of the liquid supplied from a liquid container 30. The liquid container 30 is, for example, an ink cartridge. The liquid container 30 is detachably mounted on the liquid ejecting device 11. The liquid container 30 supplies the liquid to an ejection head 24 that ejects the liquid. When the liquid in the liquid container 30 runs out, a user removes the liquid container 30 from the liquid ejecting device 11 and mounts a new liquid container 30. That is, the user replaces the liquid container 30. The previously used liquid container 30 that has been replaced is discarded.

Here, the discarded liquid container 30 is collected by a store, a manufacturer, a retail store, or a collection company of the liquid ejecting device 11 or the liquid container 30. The collected liquid container 30 is recycled. Here, the recycling includes raw material reuse in which a resin material forming a component of the liquid container 30 is re-melted and used as a raw material, and component reuse in which the component of the liquid container 30 is used as it is. In the raw material reuse, a new resin material (for example, pellets) is produced by melting the resin material of, for example, a case 31 of the liquid container 30. In this case, a component such as a new case 31 is produced by molding. In the component reuse, the case 31 included in the liquid container 30 is reused as a case 31 of a new liquid container 30, or some components included in the case 31 are used to produce a new liquid container 30. In this case, the entire case 31 of the liquid container 30 may be reused, and some components included in the case 31 may be reused.

First, a configuration of the liquid ejecting device 11 using the liquid container 30 as the liquid supply source will be described with reference to FIG. 1. As illustrated in FIG. 1, the liquid ejecting device 11 includes a housing 12 having a substantially rectangular parallelepiped shape, a portion of which is indicated by a line with alternating long and two short dashes. An operation button 13 such as a power button for driving the liquid ejecting device 11 is provided on an upper surface of the housing 12. Further, a cover 14 that can be opened/closed is provided on a surface of the housing 12 in the +Y direction, which is the transport direction in which the medium M such as paper is transported, that is, the front surface. The user can access the inside of the housing 12 in a state in which the cover 14 is opened.

A frame 15 having a substantially rectangular box shape is housed in the housing 12. A support base 16 whose longitudinal direction is the X direction extends at a bottom portion in the frame 15. Further, a transport motor 17 is provided at the bottom portion on the rear side in the frame 15. That is, a transport mechanism (not illustrated) driven by the transport motor 17 transports the medium M from the rear side toward the front side on the support base 16.

Further, a guide shaft 18 is installed above the support base 16 in the frame 15 in the X direction, which is the longitudinal direction of the support base 16. A carriage 19 is supported on the guide shaft 18 so as to be reciprocatable in its axial direction.

A driving pulley 20 and a driven pulley 21 are rotatably supported near respective both ends of the guide shaft 18 on an inner surface of a rear wall of the frame 15. An output shaft of a carriage motor 22 is coupled to the driving pulley 20. Further, an endless timing belt 23 is wound between the driving pulley 20 and the driven pulley 21. The carriage 19 is coupled to a portion of the timing belt 23. When the carriage motor 22 is driven, the carriage 19 reciprocates in a scanning direction along the X direction while being guided by the guide shaft 18 by power transmitted via the timing belt 23.

An ejection head 24 capable of ejecting the liquid is provided under the carriage 19. The ejection head 24 ejects the liquid to print images or characters on the medium M. A mounting portion 25 on which the liquid container 30 containing the liquid to be supplied to the ejection head 24 is detachably mounted is provided within the housing 12. A plurality of liquid containers 30 can be attached to and detached from the mounting portion 25. The mounting portion 25 and the carriage 19 are coupled to each other through a flexible liquid supply tube 26 through which the liquid supplied from the liquid container 30 to the ejection head 24 flows. The ejection head 24 ejects the liquid supplied from the liquid container 30 mounted on the mounting portion 25 through the liquid supply tube 26.

In the present embodiment, for example, a plurality of liquid containers 30 containing different types of liquids are mounted on the mounting portion 25. The liquid containers 30 may be, for example, ink cartridges that contain inks of different colors such as cyan, magenta, yellow, and black. The liquid container 30 includes the case 31 having a rectangular parallelepiped shape.

The housing 12 includes a cover 14 indicated by a line with alternating long and two short dashes in FIG. 1 at a position facing the mounting portion 25. When the cover 14 is opened, a mounting opening of the mounting portion 25 is exposed. The user mounts the liquid container 30 on the mounting portion 25 by moving the liquid container 30 indicated by a line with alternating long and two short dashes in FIG. 1 in an attachment/detachment direction indicated by an arrow in FIG. 1. A surface of the liquid container 30 on an inner side in a direction of movement when mounting the liquid container 30 is referred to as an inner surface, and a surface opposite to the inner surface is referred to as a back surface. When the cover 14 is opened, the back surface as an outer peripheral surface of the liquid container 30 inserted through the mounting opening of the mounting portion 25 is exposed. Therefore, when the cover 14 is opened, the back surface of the liquid container 30 mounted on the mounting portion 25 is a surface visible to the user.

Further, a maintenance device 27 is disposed at a position corresponding to a home position where the carriage 19 stands by during non-printing inside the frame 15. The maintenance device 27 includes a cap 28 that is opened upward, a suction pump (not illustrated), and the like. In the liquid ejecting device 11, the maintenance device 27 performs a maintenance operation on the ejection head 24 after the carriage 19 is moved to the home position. The maintenance device 27 performs cleaning in which the liquid is forcibly discharged from nozzles (not illustrated) of the ejection head 24 as one of the maintenance operations.

Configuration of Liquid Container 30

Figure 2:
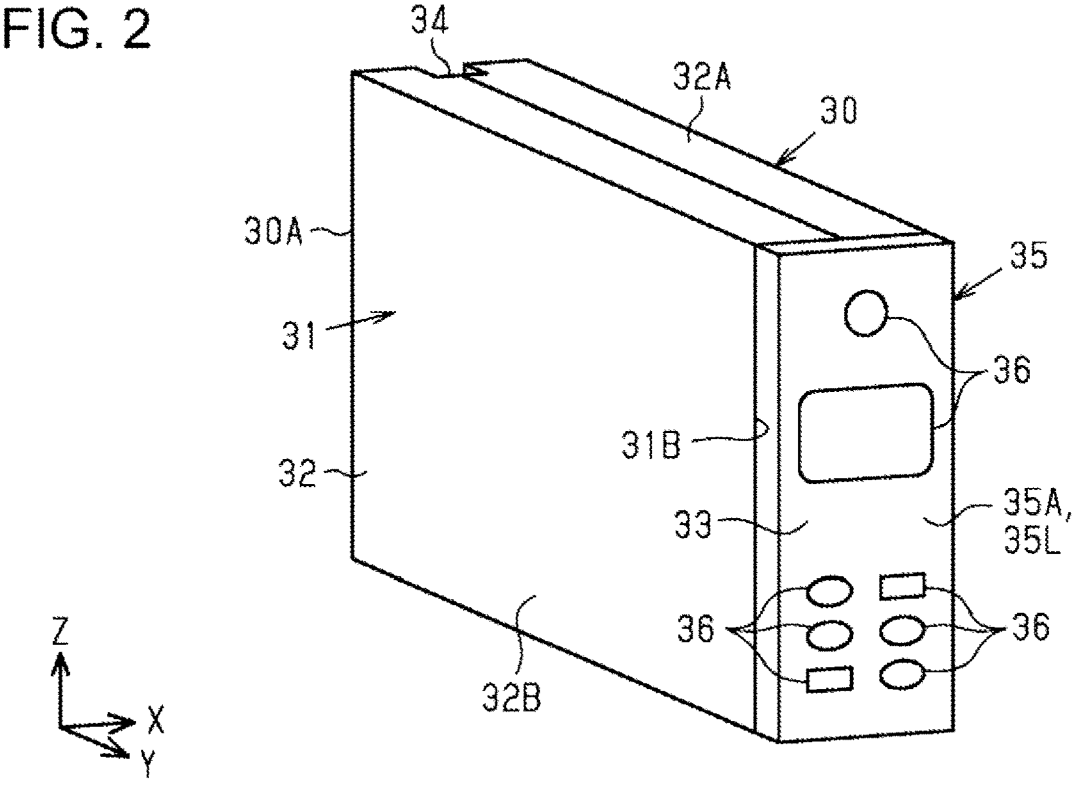
FIG. 2 is a perspective view of the liquid container viewed from a display board portion side.
Figure 3:
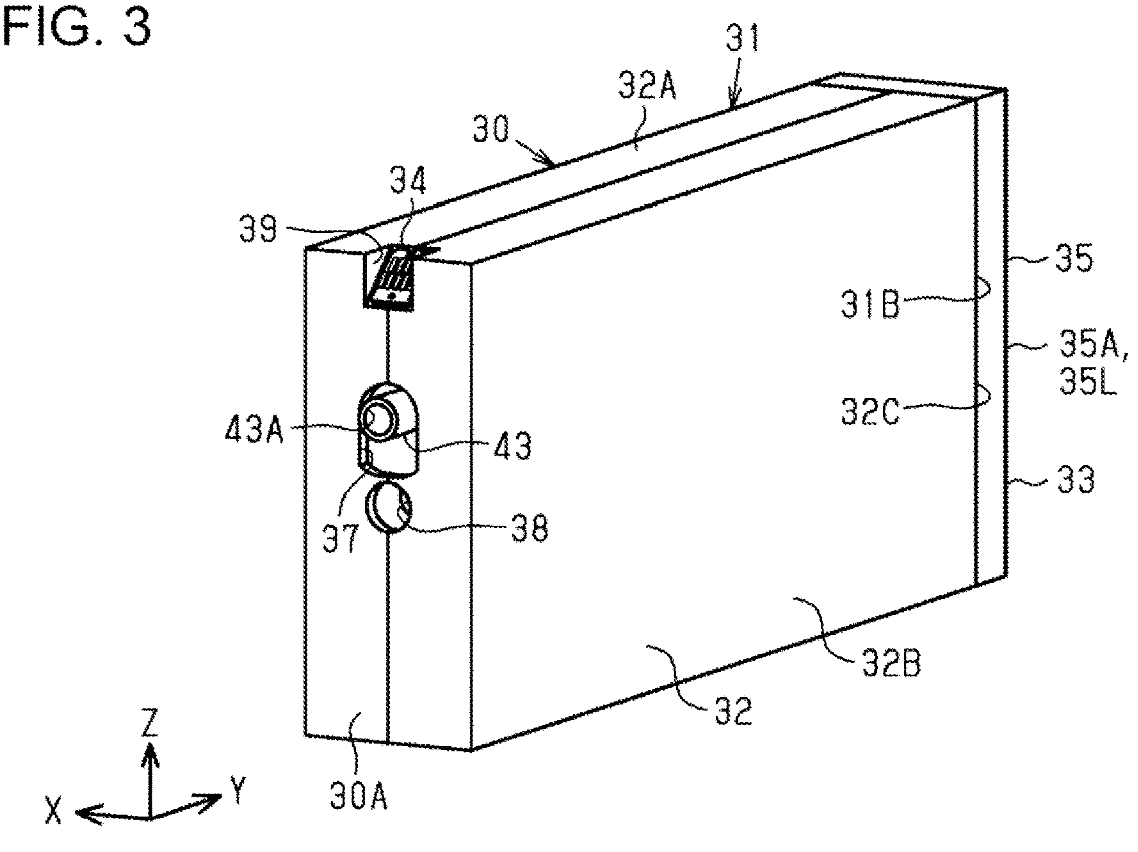
FIG. 3 is a perspective view of the liquid container viewed from a mounting surface side.

Next, a schematic configuration of the liquid container 30 will be described with reference to FIGS. 2 and 3. FIG. 2 is a perspective view of the liquid container 30 viewed from a side opposite to a mounting surface 30A. FIG. 3 is a perspective view of the liquid container 30 viewed from a mounting surface 30A side. Hereinafter, the directions of the liquid container 30 refer to directions of the liquid container 30 in a state in which the liquid container 30 is mounted on the mounting portion 25. That is, the Y direction of the liquid container 30 refers to a longitudinal direction, the X direction refers to a width direction, and the Z direction refers to a height direction.

As illustrated in FIGS. 2 and 3, the liquid container 30 includes the case 31. The case 31 houses a liquid containing body 40 (see FIG. 4). The case 31 has, for example, a rectangular parallelepiped shape. As illustrated in FIG. 3, a surface of the case 31 on the inner side in the direction of movement when mounting the liquid container 30 on the mounting portion 25 is the mounting surface 30A. The mounting surface 30A is a surface where the liquid container 30 is coupled to the mounting portion 25. A supply portion 43 through which the liquid in the liquid containing body 40 is supplied is provided in the mounting surface 30A of the case 31. The number of portions where the liquid container 30 is coupled to the mounting portion 25 is not limited to one and may be plural. One of the portions where the liquid container 30 is coupled to the mounting portion 25 is the supply portion 43. The supply portion 43 is exposed through a hole 37 formed in the mounting surface 30A of the case 31. The supply portion 43 has a supply port 43A through which the liquid such as ink is taken out.

Another one of the portions where the liquid container 30 is coupled to the mounting portion 25 is a substrate 34 electrically coupled to a coupling terminal (not illustrated) on a mounting portion 25 side. The substrate 34 includes, for example, a storage element and a coupling terminal. The substrate 34 stores data of identification information regarding the liquid container 30 in the storage element. Further, the mounting surface 30A has a positioning pin hole 38 into which a positioning pin (not illustrated) provided on the mounting portion 25 is inserted.

As described above, in the present embodiment, the mounting surface 30A is a surface of the liquid container 30 where the supply portion 43 is exposed, a surface where the substrate 34 is provided, or a surface where the positioning pin hole 38 is formed. The mounting surface 30A is basically limited to one surface of the case 31, but the liquid container 30 may have two mounting surfaces 30A by dividedly providing the supply portion 43, the substrate 34, and the pin hole 38 in two different surfaces.

As illustrated in FIG. 2, the liquid container 30 includes a display board portion 35 detachably provided in a surface region 31B of the case 31 that is different from the mounting surface 30A. In the example illustrated in FIG. 2, the surface region 31B is a surface of the case 31 opposite to the mounting surface 30A. Therefore, the display board portion 35 is disposed on the surface of the liquid container 30 opposite to the mounting surface 30A. It is sufficient that the surface region 31B is a surface different from the mounting surface 30A.

As illustrated in FIG. 2, identification information 36 regarding the liquid container 30 is gathered and displayed on the display board portion 35. In the present embodiment, all pieces of identification information 36 are displayed on the display board portion 35. In the display board portion 35, a surface 35A opposite to the mounting surface 30A is a displayed surface on which the identification information 36 is displayed. The surface 35A is a surface of the liquid container 30 mounted on the mounting portion 25 illustrated in FIG. 1 that is visible to the user when the cover 14 is opened. Therefore, the identification information 36 displayed on the surface 35A of the display board portion 35 is easily visible to the user when the liquid container 30 is in a mounted state.

As illustrated in FIG. 2, a label 35L displaying the identification information 36 may be pasted to the display board portion 35. The identification information 36 may be directly recorded on the display board portion 35. The identification information 36 may be recorded, for example, by printing. The printing may be performed using a printing device. The printing device may be a screen printing device, an electrophotographic printer, an ink jet printer, or the like. The printing may also be engraving using a laser beam. Further, the identification information 36 on the display board portion 35 may include both the identification information 36 displayed on the label 35L and the directly recorded identification information 36. That is, a display form of the identification information 36 displayed on the surface 35A of the display board portion 35 may be any display form as long as the identification information 36 does not disappear over a long period of time.

When the label 35L is pasted to the display board portion 35, the display board portion 35 may be recycled together with the label. Further, when the identification information 36 is directly recorded on the display board portion 35, the display board portion 35 may be recycled together with the recorded identification information 36 as a recycled component.

Regarding Identification Information 36

The identification information 36 displayed on the display board portion 35 includes liquid type information, a manufacturing date, a lot number, and the like. Here, the liquid type information is information regarding the type of the liquid. When the liquid is ink, the liquid type information is ink type information. The ink type information is information regarding the type of the ink. The type of the ink includes color information indicating the color of the ink, coloring material information regarding the type of a coloring material of the ink such as information indicating a pigment ink or a dye ink, and the like. Further, the liquid type information may include information regarding a product number of the ink. The type and color of the ink can be specified by the product number of the ink.

The manufacturing date may be a manufacturing date when the display board portion 35 was manufactured, and the lot number may be a lot number at which the display board portion 35 was manufactured. The display board portion 35 is recycled and reused repeatedly. Therefore, a time limit in which recycling is available is managed based on the manufacturing date or the lot number. For example, when a predetermined time limit such as five or ten years from the manufacturing date has not been reached, the display board portion 35 can be reused as a component of the liquid container 30, and when the predetermined time limit has been reached, the display board portion 35 is not recycled any further and, for example, discarded. In addition, the number of times the display board portion 35 is recycled may be managed, and the display board portion 35 may be reused as long as the number of times the recycling is performed is equal to or less than a threshold, and when the number of times the recycling is performed exceeds the threshold, the display board portion 35 is not reused any further.

Recycling-related information such as the number of times the case 31 or the display board portion 35 is recycled or a recycling time limit may be stored in the storage element of the substrate 34 in addition to the ink information. In this case, the storage element of the substrate 34 may separately store the recycling-related information for each of the component of the case 31 and the display board portion 35. For example, the recycling-related information stored in the storage element of the substrate 34 may be updated every time the liquid container 30 is recycled.

Further, the identification information 36 may include destination information regarding a destination. Here, the destination refers to a country or region where the liquid container 30 is to be sold or used. For example, the destination information is information indicating the destination such as Japan, the United States, the European Community, China, or the Middle East.

The identification information 36 may include a two-dimensional code such as a QR Code (registered trademark). The two-dimensional code may include address information such as a URL for connecting to a service page on the Internet when read. Further, the identification information 36 may include information regarding precautions.

Structure of Liquid Container 30

Figure 4:
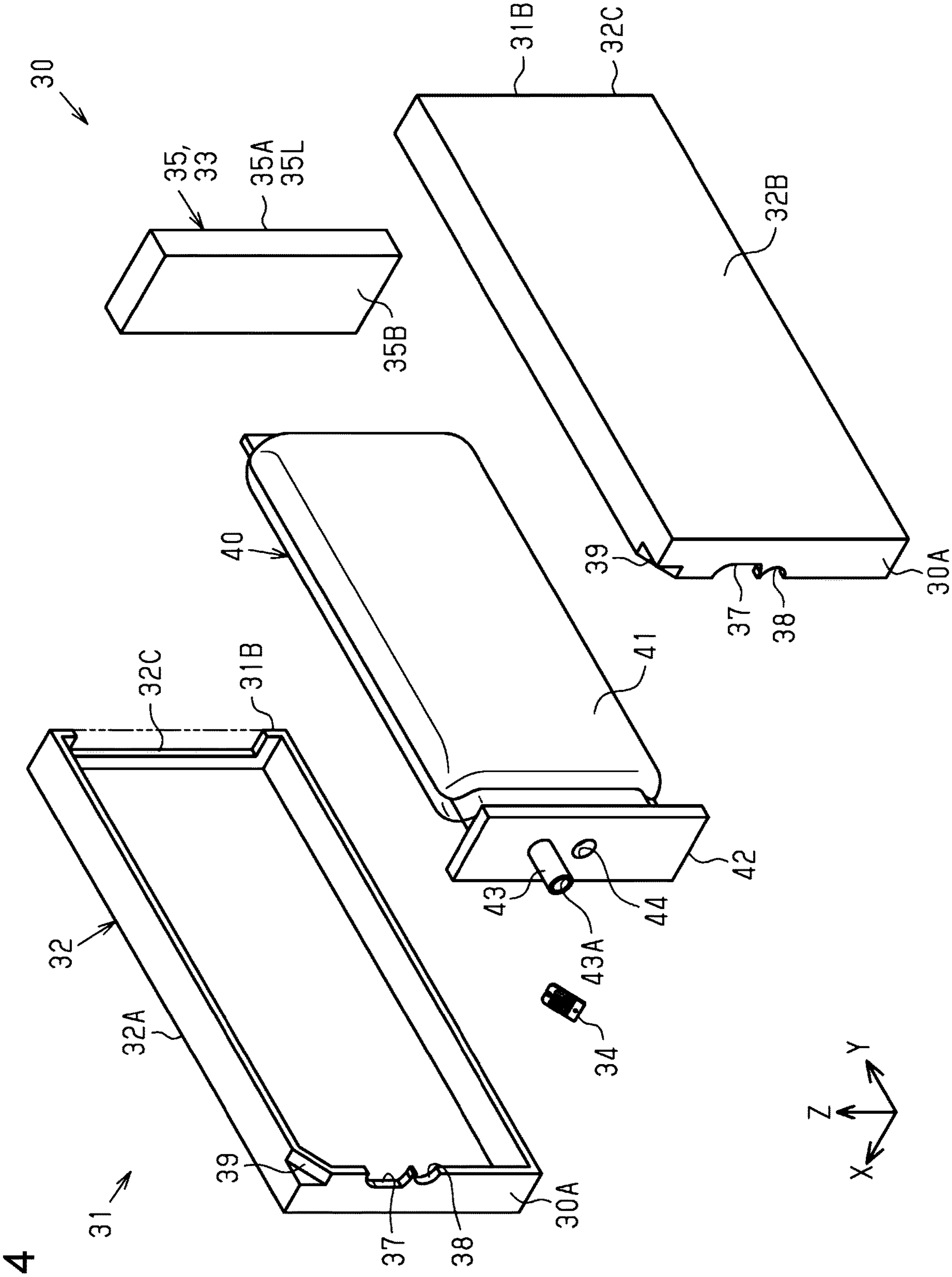
FIG. 4 is an exploded perspective view of the liquid container.

As illustrated in FIG. 4, the liquid container 30 includes the liquid containing body 40 that contains the liquid, the case 31 that houses the liquid containing body 40, and the display board portion 35 that is detachably attached to the surface region 31B of the case 31.

The liquid containing body 40 is, for example, a liquid pack that contains the liquid. When the liquid is ink, the liquid containing body 40 is an ink pack that contains the ink. The liquid containing body 40 includes a bag-shaped packing portion 41 made of a flexible material that contains the liquid, and a supply member 42 coupled to an opening end portion of the packing portion 41. The supply member 42 includes a tubular supply portion 43 that takes out the liquid in the packing portion 41 and a hole portion 44 that communicates with the pin hole 38.

Information regarding the manufacturing date or the lot number related to the liquid such as the ink contained in the liquid containing body 40 may be displayed on the packing portion 41 by pasting a label to the packing portion 41 or printing the information on the packing portion.

The case 31 includes a case body 32 and a lid member 33. The lid member 33 may also serve as the display board portion 35. The case body 32 includes a pair of case members 32A and 32B. The substrate 34 is fixed to a recess 39 formed at an upper end portion of the mounting surface 30A of the case 31 or the case body 32.

As illustrated in FIG. 4, the case body 32 having an opening 32C at one end may be formed by coupling the pair of case members 32A and 32B in a state in which the liquid containing body 40 is interposed therebetween, or the case 31 may be formed by coupling the pair of case members 32A and 32B in a state in which the liquid containing body 40 is interposed therebetween. In the former case, the case 31 is formed by the case body 32 and the lid member 33 that closes the opening 32C. In this case, the lid member 33 may also serve as the display board portion 35. In this case, the display board portion 35 is detachably attached to the surface region 31B that is an end surface of the case body 32 having the opening 32C. In this case, the display board portion 35 is a part of the case 31 because the display board portion 35 also serves as the lid member 33 which is one of constituent members of the case 31.

On the other hand, when the case 31 is formed by joining the pair of case members 32A and 32B, end surfaces of the pair of case members 32A and 32B that are opposite to the mounting surface 30A are blocked as indicated by a line with alternating long and two short dashes. The display board portion 35 is detachably attached to the surface region 31B that is an end surface of the case 31 opposite to the mounting surface 30A. In this case, the display board portion 35 is a separate member from the case 31.

Next, a first embodiment in which the lid member 33 that closes the opening 32C of the case body 32 also serves as the display board portion 35, and a second example in which the display board portion 35 is a separate member from the case 31 will be described. Hereinafter, a configuration of a liquid container 30 of the first embodiment and a configuration of a liquid container 30 of the second example will be described in order.

First Embodiment

Figure 5:
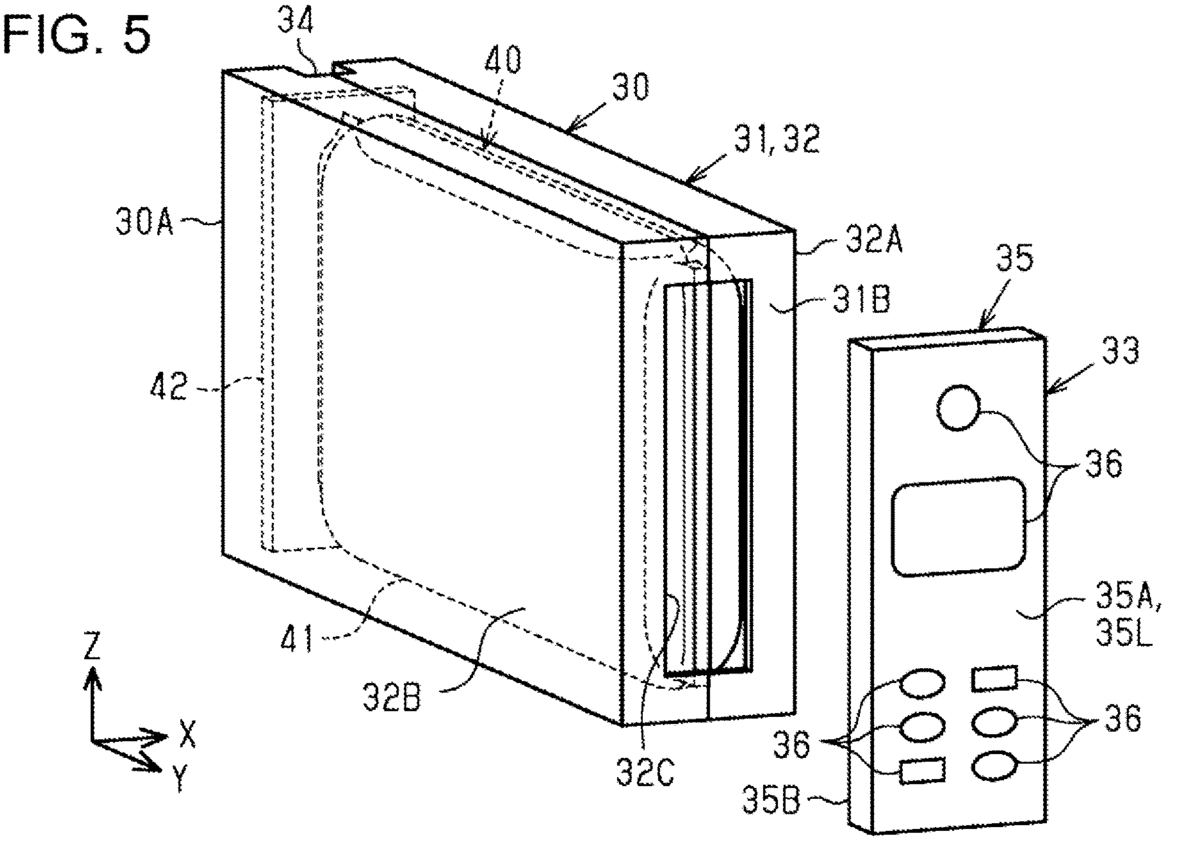
FIG. 5 is an exploded perspective view illustrating a liquid container of a first embodiment in which a lid member that closes an opening of a case body also serves as a display board portion.

First, the configuration of the liquid container 30 of the first embodiment will be described with reference to FIG. 5. As illustrated in FIG. 5, a display board portion 35 is a part of a lid member 33 included in a case 31. The case 31 includes a case body 32 having a bottomed rectangular cylindrical shape and having an opening 32C at one end portion, and the lid member 33 attached to the case body 32 so as to close the opening 32C. The lid member 33 is attached to block the opening 32C positioned at the end portion of the case body 32, the end portion being opposite to a mounting surface 30A.

As illustrated in FIG. 5, the lid member 33 is not limited to a plate shape as illustrated in FIG. 5, and may have a bottomed rectangular box shape. In this case, a plate-shaped bottom portion of the box-shaped lid member 33 is used as the display board portion 35.

Second Example

Figure 6:
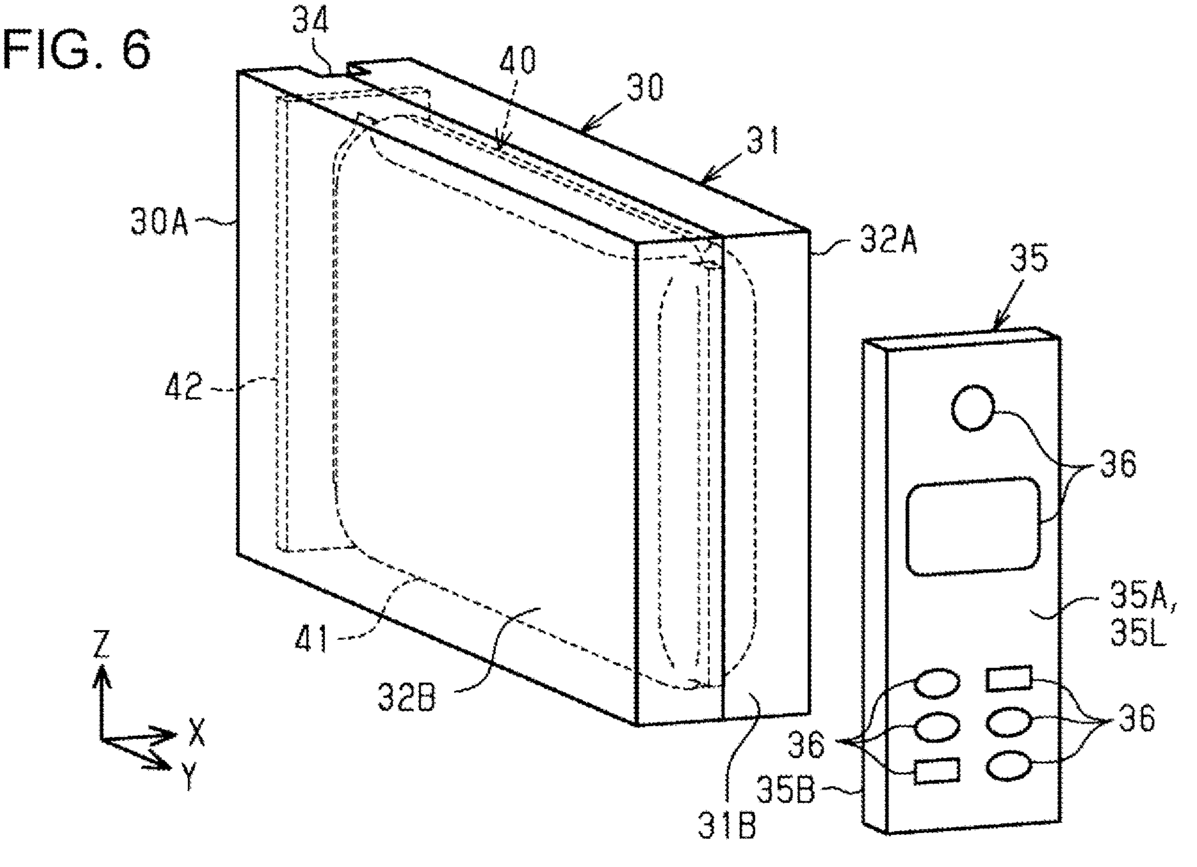
FIG. 6 is an exploded perspective view illustrating a liquid container in which a display board portion is a separate member from a case.

Next, the configuration of the liquid container 30 of the second example will be described with reference to FIG. 6.

A display board portion 35 of the second example is a separate member from a case 31. The case 31 is formed by coupling a pair of case members 32A and 32B in a state in which a liquid containing body 40 is housed in the case 31. The display board portion 35 is detachably attached to a surface region 31B that is a closed end surface of the case 31 opposite to a mounting surface 30A.

Detachable Structure of Display Board Portion 35

Next, a detachable structure of the display board portion 35 will be described with reference to FIGS. 7 to 10. In the liquid container 30 of the present embodiment, the display board portion 35 is detachably attached to the surface region 31B of the liquid container 30. The detachable structure of the present embodiment is a locking structure 50 that enables attachment and detachment of the display board portion 35 to and from the surface region 31B by locking. The locking structure 50 that locks the display board portion 35 to the surface region 31B will be described below with reference to FIGS. 7 to 10.

Figure 7:
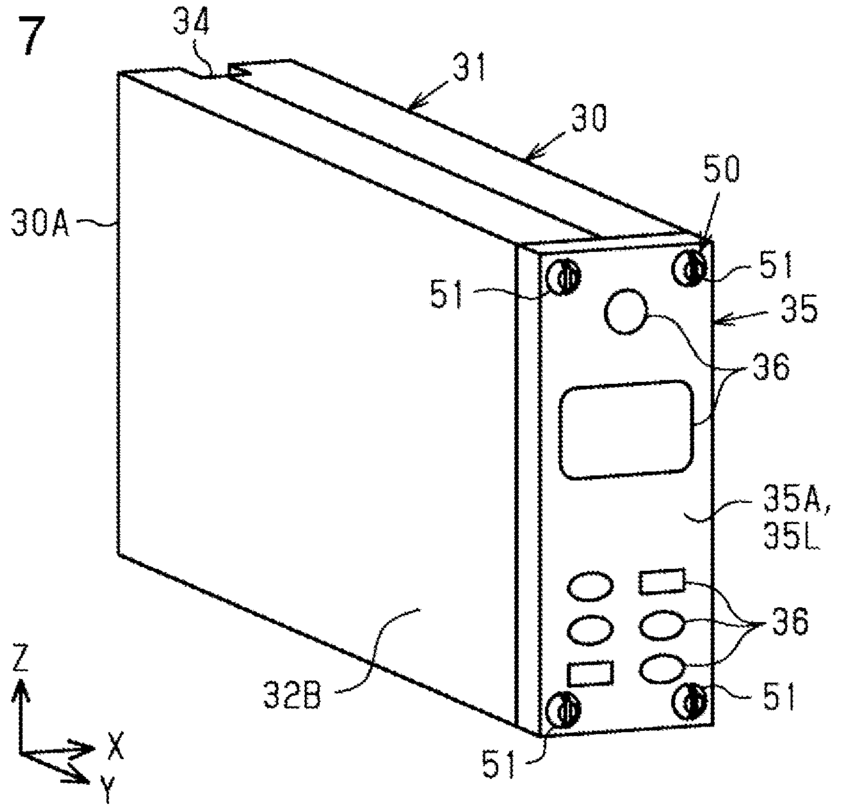
FIG. 7 is a perspective view illustrating a liquid container in which a display board portion is locked by a locking structure.

The display board portion 35 illustrated in FIG. 7 is detachably locked to the surface region 31B of the case 31. The display board portion 35 is detachably locked to the surface region 31B of the case 31 by a plurality of locking pins 51.

Figure 8:
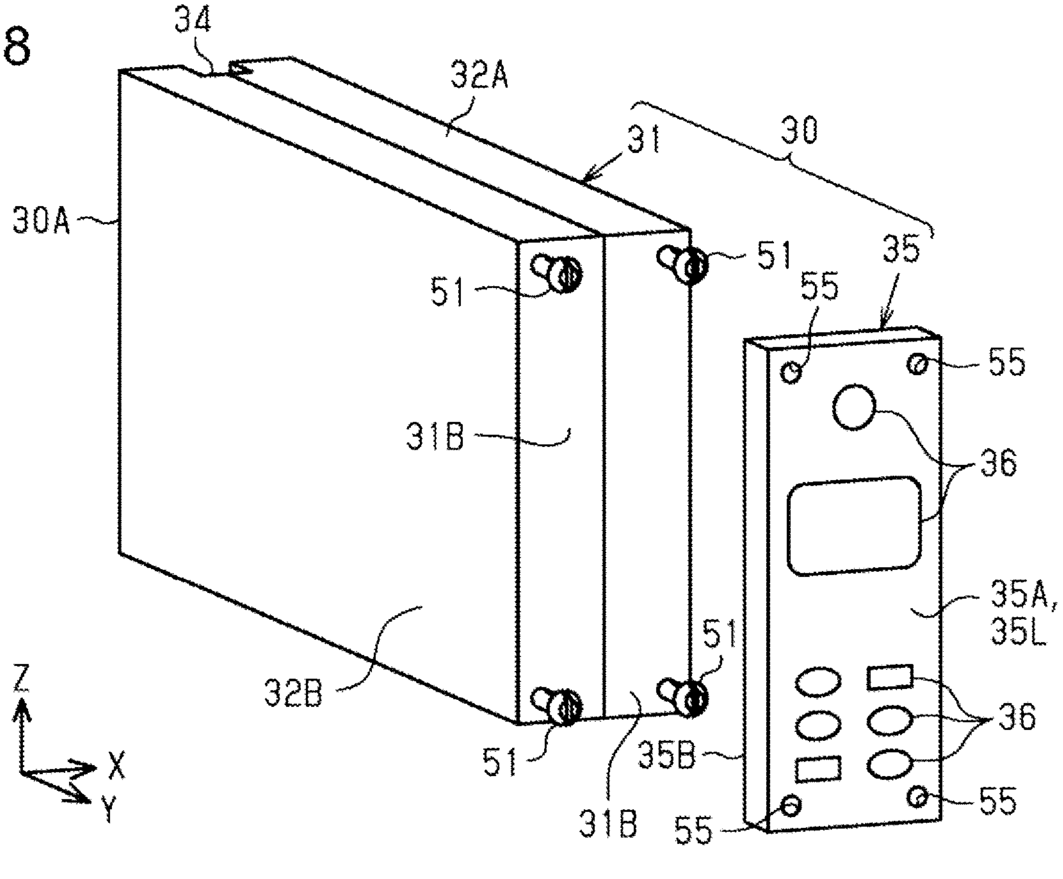
FIG. 8 is an exploded perspective view illustrating the liquid container having the locking structure for locking the display board portion.

As illustrated in FIG. 8, the plurality of locking pins 51 protrude from corners of the surface region 31B. In the example illustrated in FIG. 8, four locking pins 51 are provided at four corners of the surface region 31B so as to protrude in a direction perpendicular to the surface. Meanwhile, four holes 55 are formed in the display board portion 35 at positions corresponding to the four locking pins 51.

Figure 9:
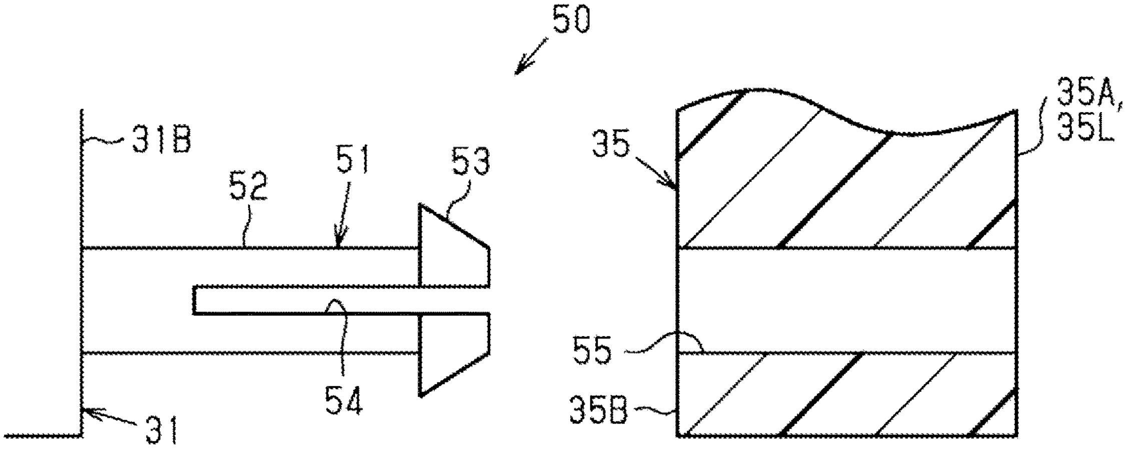
FIG. 9 is a partially cut-away side view illustrating the locking structure.

As illustrated in FIG. 9, the locking pin 51 includes a shaft portion 52 and a head portion 53 formed at a tip portion of the shaft portion 52 and having a larger diameter than the shaft portion 52. The head portion 53 has a conical shape whose diameter decreases toward a tip side in an axial direction of the shaft portion 52. The locking pin 51 has a slit portion 54 formed from a tip of the head portion 53 to the middle of the shaft portion 52.

Meanwhile, the display board portion 35 has the holes 55 formed at positions corresponding to the locking pins 51. An inner diameter of the hole 55 is slightly smaller than the diameter of the shaft portion 52 of the locking pin 51 and smaller than the maximum diameter of the head portion 53.

Figure 10:
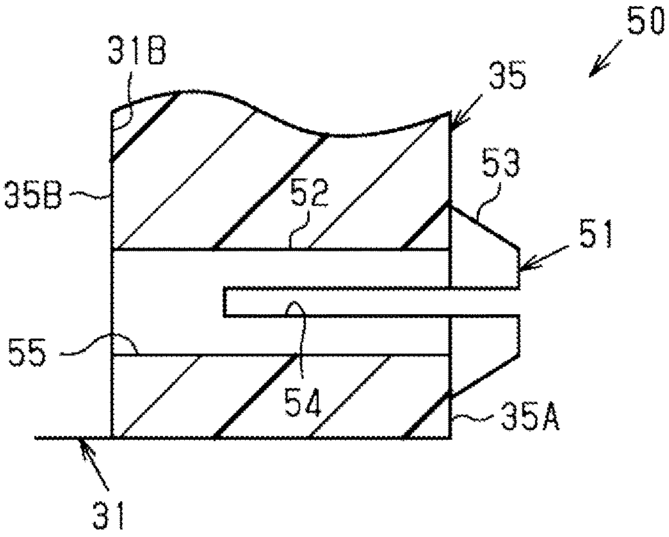
FIG. 10 is a partially cut-away side view illustrating a state in which a locking pin locks the display board portion.

Therefore, as illustrated in FIG. 10, the diameter of the head portion 53 of the locking pin 51 is decreased when the slit portion 54 is crushed during a process in which the head portion 53 is inserted into the hole 55. When the head portion 53 having the decreased diameter finishes passing through the hole 55, the head portion 53 expands to the original diameter thereof which is larger than the inner diameter of the hole 55. As a result, the display board portion 35 is locked by the head portion 53 of the locking pin 51 as illustrated in FIG. 10. Meanwhile, when an operator uses a tool or the like to apply a force in a direction of separating the surface region 31B and the display board portion 35 while decreasing the diameter of the head portion 53, the head portion 53 having the decreased diameter is moved in the hole 55 in a direction of being pulled out from the hole 55, so that the head portion 53 of the locking pin 51 is pulled out from the hole 55. As a result, as illustrated in FIG. 9, the locking pin 51 is unlocked, and the display board portion 35 can be removed from the surface region 31B.

Actions of Embodiment

Next, the actions of the liquid container 30 will be described. The new liquid container 30 is mounted on the mounting portion 25 of the liquid ejecting device 11. When the cover 14 is opened, the display board portion 35 of the liquid container 30 mounted on the mounting portion 25 is exposed so as to be visible to the user. Therefore, the user can visually recognize the identification information 36 of the liquid container 30 mounted on the mounting portion 25. The liquid container 30 mounted on the mounting portion 25 is used as the liquid supply source for the ejection head 24 in the liquid ejecting device 11. When the liquid ejecting device 11 performs printing on the medium M, as the liquid is ejected from the ejection head 24, the liquid contained in the liquid containing body 40 in the liquid container 30 is consumed. When the liquid in the liquid containing body 40 runs low or runs out, the liquid container 30 is removed from the mounting portion 25. In the present embodiment, the previously used liquid container 30 is reused as a component of the recycled liquid container 30. In particular, the members included in the case 31 and the display board portion 35 of the liquid container 30 are reused as the components without being melted or discarded. Since the display board portion 35 occupies a small proportion of the entire liquid container 30, the display board portion 35 may be discarded.

The present embodiment includes a method for reusing the liquid container 30 as described below. The liquid container 30 includes the detachable display board portion 35 in which the identification information 36 regarding the liquid container 30 is gathered and displayed on the surface region 31B different from the mounting surface 30A of the case 31 that houses the liquid containing body 40. A method for recycling the liquid container 30 includes the following three processes (a) to (c).

(a) Collecting the previously used liquid container 30 in which the liquid in the liquid containing body 40 housed in the case 31 of which the display board portion 35 is detachably provided on the surface region 31B different from the mounting surface was used.

(b) Removing the display board portion 35 from the previously used liquid container 30.

(c) Reusing at least some of the components of the case 31 from which the display board portion 35 was removed, and recycling the liquid container 30 by detachably providing the display board portion 35 that is new or recycled on the surface region 31B of the case 31 recycled by reusing the components.

Hereinafter, details of (a) to (c) above will be described in order. The liquid container 30 has the configuration described in the present embodiment. The liquid container 30 is manufactured by a manufacturer. The liquid container 30 is detachably provided on the surface region 31B of the case 31 that is different from the mounting surface 30A. When the display board portion 35 is a part of the lid member 33, since the lid member 33 is detachable, the display board portion 35 is also detachable. The lid member 33 may be disassembled into a lid plate portion, which is a plate-shaped portion facing the opening 32C, and other portions. The lid plate portion that is a part of the lid member 33 may be used as the display board portion 35.

Regarding (a)

The user takes the previously used liquid container 30 to a store, a retail store, or the like, or ships the previously used liquid container to a store, a retail store, the manufacturer, a recycling factory, or the like. In this way, the store, the retail store, the manufacturer, the recycling factory, or the like collects the previously used liquid container 30. The store and retail store deliver the previously used liquid container 30 to the manufacturer, the recycling factory, or the like. In this way, the previously used liquid container 30 is finally collected by the manufacturer, the recycling factory, or the like that recycles the previously used liquid container 30. When the previously used liquid container 30 passes through a disassembly factory before reaching the manufacturer, the recycling factory, or the like, the previously used liquid container 30 is collected by the disassembly factory.

Regarding (b)

The display board portion 35 is removed from the previously used liquid container 30. The display board portion 35 is removed from the previously used liquid container 30 at the manufacturer, the recycling factory, or the disassembly factory. The display board portion 35 is removed manually by the operator, or removed semi-automatically or automatically using an automatic removal machine. The automatic removal machine disassembles the liquid container 30 into the case 31 or the case body 32 and the display board portion 35 by moving the display board portion 35 relative to the case 31 or the case body 32 of the set liquid container 30 in a removal direction.

Regarding (c)

At least some of the components of the case 31 from which the display board portion 35 was removed are reused. The reused components of the case 31 are the case 31 or the case body 32. The case 31 or the case body 32 is disassembled into components manually or using the automatic disassembly machine. For example, when the display board portion 35 is a separate member from the case 31, the case 31 is disassembled into the pair of case members 32A and 32B and the lid member 33. Further, when the lid member 33 also serves as the display board portion 35, the case body 32 is disassembled into the pair of case members 32A and 32B. In this way, the disassembled components, the pair of case members 32A and 32B and, if necessary, the lid member 33, are cleaned and inspected, and then classified for each component for recycling the liquid container 30.

On the other hand, although the display board portion 35 is reused in the present embodiment, the display board portion 35 may be discarded. When reusing the display board portion 35, the display board portion 35 is reused as a component as it is. After cleaning, inspection, and the like, the display board portion 35 is used as one component for manufacturing the recycled liquid container 30.

The identification information 36 may be gathered on the display board portion 35. Therefore, for components other than the display board portion, there is either no label or record of the identification information 36, or if present, the label or record of the identification information 36 is in minimal quantity. Furthermore, since the identification information 36 includes the liquid-related information regarding the type of the liquid, when the display board portion 35 is reused, the display board portion 35 can be reused only for the liquid container 30 that houses the liquid containing body 40 containing the same type of liquid. Therefore, the display board portion 35 is classified according to a content of the identification information 36. For example, the display board portion 35 is classified for each liquid type (for example, an ink color).

For example, hitherto, a label displaying a part of the identification information 36 was pasted to a component included in the case 31, or a part of the identification information 36 was recorded on the component. In these cases, it was necessary to perform work of removing the label with the identification information 36 from a resin component such as the case 31 or erasing the recorded identification information 36. The work was a burden when recycling the resin component such as the case 31. Furthermore, when the record on the resin component remains unerased, or a part of the label or glue remains, the quality of the recycled liquid container 30 deteriorates. Therefore, it is necessary to reliably peel off the label and erase the printed identification information. When the liquid container 30 is recycled in this way, a workload required when disposing of the liquid container 30 increases. Therefore, when the cost of using the component as it is as a recycled component is not justified, the component is often melted and used as a resin material.

In the present embodiment, since the identification information 36 is gathered on the display board portion 35, a resin component included in the case 31 can be used as it is as a recycled component. This eliminates the need to peel off the label and erase the record of the identification information, which were previously necessary. Furthermore, the display board portion 35 can be repeatedly reused as a recycled component of the liquid container 30 for which the same identification information 36 is used. The display board portion 35 is used as a component when, for example, the liquid container 30 having the same liquid type information (for example, the ink type information) in the identification information 36 is recycled. The display board portion 35 is reused by being detachably attached to the surface region 31B of the recycled case 31 or case body 32. For example, it is assumed that the color information in the ink type information of the identification information 36 displayed on the display board portion 35 indicates "cyan", and a material of the ink is "pigment ink". The liquid containing body 40 containing the cyan pigment ink is housed in the recycled case 31 or case body 32. Then, the display board portion 35 is attached to the surface region 31B of the case 31 or the case body 32, thereby recycling the liquid container 30.

In this way, it is possible to increase a proportion of a volume of the resin component of the liquid container 30 that can be reused as a component. A proportion of a portion of the liquid container 30 that can be disposed of as a valuable resource increases. In addition, since the proportion of the volume of the display board portion 35 to the entire liquid container 30 is small, the proportion of the portion of the liquid container 30 that can be disposed of as a valuable resource is high even when the display board portion 35 is not reused but is discarded.

According to the first embodiment described in detail above, the following effects can be obtained.

(1-1) The liquid container 30 includes the liquid containing body 40 that contains the liquid, the case 31 that houses the liquid containing body 40, and the display board portion 35 on which the identification information 36 regarding the liquid container 30 is gathered and displayed. The case 31 has the mounting surface 30A from which the supply portion 43 through which the liquid in the liquid containing body 40 is supplied is exposed. The display board portion 35 is detachably disposed on the surface region 31B of the case 31 that is different from the mounting surface 30A. According to this configuration, the identification information 36 of the liquid container 30 is gathered on the display board portion 35 that can be attached to and detached from the surface region 31B different from the mounting surface 30A of the case 31, and thus, it is sufficient that the display board portion 35 is removed from the case 31 at the time of discarding. As a result, it is possible to reduce a required disposal workload of peeling off the label or erasing the printed information from a portion of the case 31 other than the display board portion 35 (the greater part of the case 31 except for the lid member 33 of the case 31 or the entire case 31). Therefore, at the time of recycling, at least the greater part of the case 31 of the liquid container 30 can be easily disposed of as a valuable resource. Therefore, it is possible to increase the proportion of the portion of the case 31 that can be disposed of as a valuable resource while reducing the workload required for recycling at the time of disposal. The display board portion 35 may be disposed of, but when the display board portion 35 is to be reused, it is sufficient that the recycled display board portion 35 is simply attached when manufacturing the liquid container 30 by recycling. Therefore, it is possible to reduce the workload required for recycling, such as pasting the label 35L and printing the information. Therefore, it is possible to further increase the proportion of the portion of the liquid container 30 that can be disposed of as a valuable resource while reducing the workload required for recycling.

(1-2) All pieces of identification information 36 are displayed on the display board portion 35. According to this configuration, all the pieces of identification information 36 are displayed on the display board portion 35, so that the workload at the time of disposal can be further reduced, and the proportion of the portion of the case 31 of the liquid container 30 that can be disposed of as a valuable resource can be increased.

(1-3) The display board portion 35 is at least a part of the lid member 33 included in the case 31. According to this configuration, the lid member 33 also serves as the display board portion 35, and it is thus possible to increase the proportion of the portion that can be disposed of as a valuable resource while reducing the workload at the time of disposal without increasing the number of components included in the liquid container 30.

(1-4) The case 31 includes the case body 32 formed by coupling the pair of case members 32A and 32B in a state in which the liquid containing body 40 is interposed therebetween, having a bottomed rectangular cylindrical shape, and having the opening 32C at one end, and the lid member 33 attached to the case body 32 so as to close the opening 32C. The case body 32 has the opening 32C at the end portion opposite to the mounting surface 30A. According to this configuration, the lid member 33 is attached to the end portion of the case body 32 opposite to the mounting surface 30A, and thus, the lid member 33 can also serve as the display board portion 35. Therefore, it is possible to increase the proportion of the portion that can be disposed of as a valuable resource while reducing the workload at the time of disposal without increasing the number of components included in the liquid container 30.

(1-5) Since the display board portion 35 is a separate member from the constituent member of the case 31, the number of components increases, but it is possible to increase the proportion of the portion that can be disposed of as a valuable resource while reducing the workload at the time of disposal.

(1-6) The case 31 includes the case body 32 having a bottomed rectangular cylindrical shape and having the opening 32C at one end, and the lid member 33 attached to the case body 32 so as to close the opening 32C. The case body 32 is formed by coupling the pair of case members 32A and 32B in a state in which the liquid containing body 40 is interposed therebetween. The lid member 33 includes the mounting surface 30A. The display board portion 35 is detachably provided on the end portion of the case body 32 that is opposite to the mounting surface 30A. According to this configuration, the display board portion 35 is detachably provided on the surface region 31B opposite to the lid member 33 disposed on the mounting surface 30A side of the case body 32, and thus, the number of parts increases, but it is possible to increase the proportion of the portion that can be disposed of as a valuable resource while reducing the workload at the time of disposal.

(1-7) Since the label 35L displaying the identification information 36 is pasted to the display board portion 35, when the display board portion 35 is discarded when disposing of the liquid container 30, it is possible to reduce the workload of peeling off the label 35L. On the other hand, when the display board portion 35 is used repeatedly, it is possible to reduce the workload required for recycling, such as pasting the label 35L when recycling the liquid container 30. Therefore, it is possible to increase the proportion of the portion of the case 31 of the liquid container 30 that can be disposed of as a valuable resource while reducing the workload.

(1-8) The identification information 36 is directly recorded on the display board portion 35. According to this configuration, since the identification information 36 is directly recorded on the display board portion 35, when the display board portion 35 is discarded when disposing of the liquid container 30, the workload of erasing the directly recorded identification information 36 can be reduced. On the other hand, when the display board portion 35 is used repeatedly, it is possible to reduce the workload required for recycling, such as directly recording the identification information 36 when recycling the liquid container 30. Therefore, it is possible to increase the proportion of the portion of the case 31 of the liquid container 30 that can be disposed of as a valuable resource while reducing the workload.

(1-9) The display board portion 35 is detachably locked to the surface region 31B of the case 31. According to this configuration, the display board portion 35 is detachably provided by being locked to the surface region 31B of the case 31, and thus, it is relatively easy to attach and detach the display board portion 35 when manufacturing, recycling, and disposing of the liquid container 30. Further, it is easy for the user to avoid removing the display board portion 35.

(1-10) The method for reusing the liquid container 30 includes the following (a) to (d), which are performed in order: (a) collecting the previously used liquid container 30 in which the liquid in the liquid containing body 40 was used; (b) removing the display board portion 35 from the previously used liquid container 30; and (c) reusing at least some of the components of the case 31 from which the display board portion 35 was removed, and recycling the liquid container 30 by detachably providing the display board portion 35 that is new or recycled on the surface region 31B of the case 31 recycled by reusing the components. With this method, it is possible to increase the proportion of the portion of the case 31 that can be disposed of as a valuable resource while reducing the workload required for recycling at the time of disposal.

Second Embodiment

Next, a liquid container 30 according to a second embodiment will be described with reference to FIGS. 11 to 16. The second embodiment is different from the first embodiment in the detachable structure. The detachable structure of the present embodiment is a slide-type detachable structure in which a display board portion 35 can be attached and detached by relative movement of sliding along a surface of a surface region 31B. A basic configuration of a liquid ejecting device 11 is similar to that of the first embodiment illustrated in FIG. 1. A basic configuration of the liquid container 30 is also similar to that of the first embodiment illustrated in FIGS. 2 to 6. Further, the display board portion 35 may have the configuration of the first embodiment in which the display board portion 35 also serves as a lid member 33, or may have a configuration of the second example in which the display board portion 35 is a separate member from a case 31. Furthermore, a method for reusing the liquid container 30 is also similar to that of the first embodiment. Hereinafter, the configuration of the liquid container 30, especially the configuration in which the display board portion 35 can be attached to and detached from the surface region 31B, will be mainly described.

Figure 11:
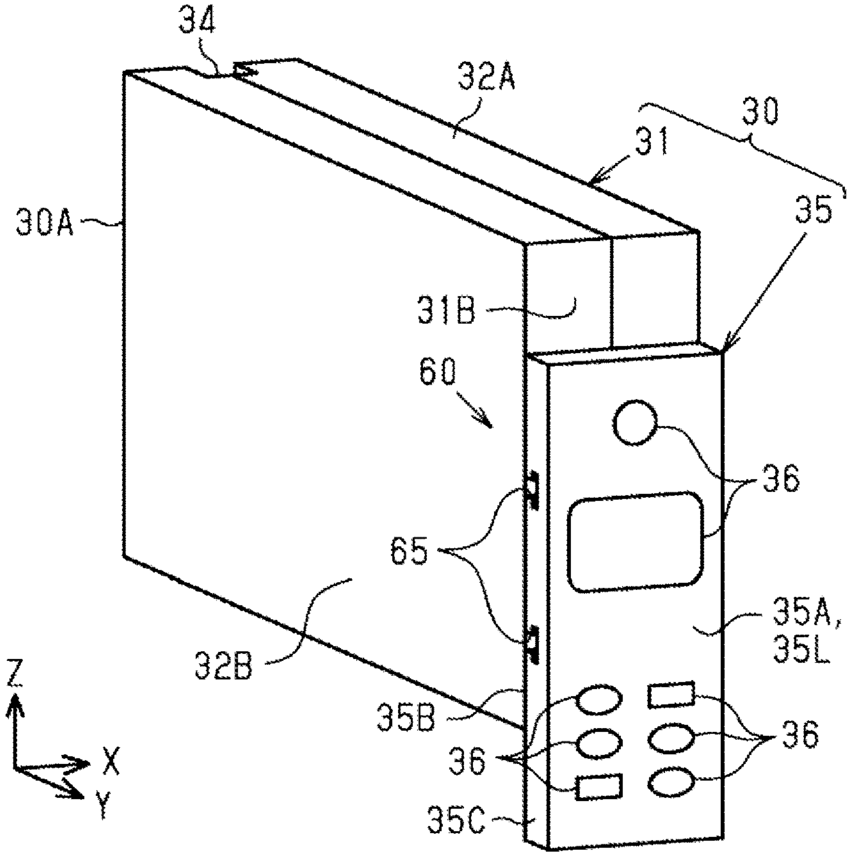
FIG. 11 is a perspective view illustrating a liquid container having a slide-type detachable structure that enables attachment and detachment of a display board portion.
Figure 12:
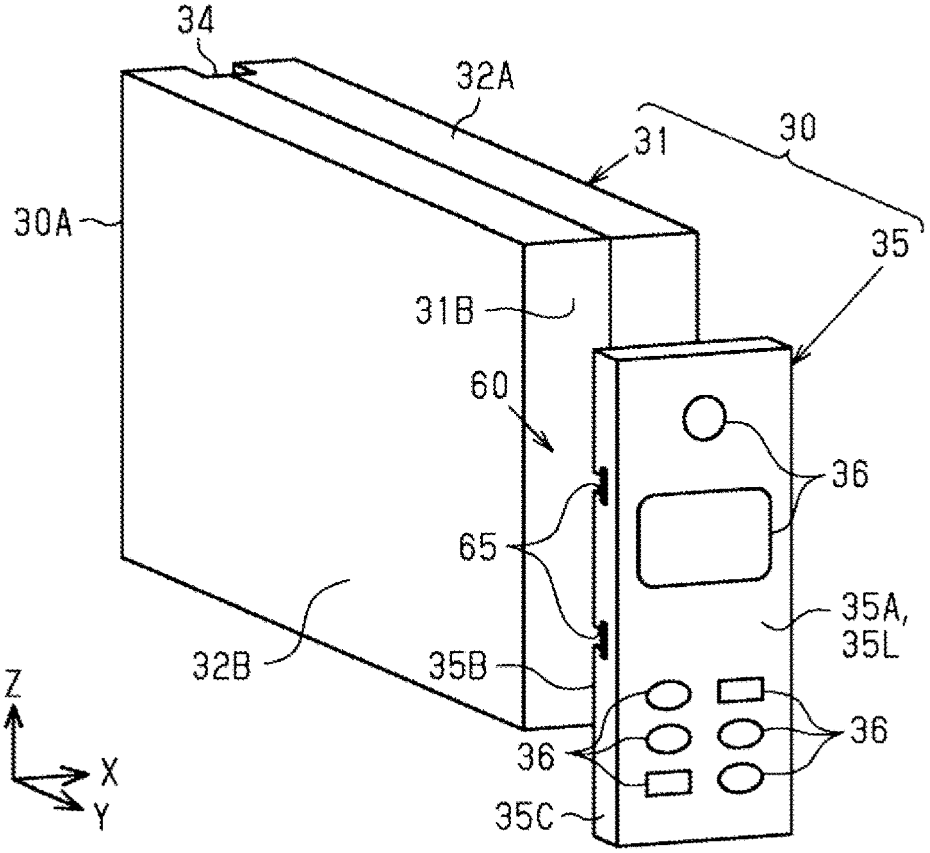
FIG. 12 is a perspective view illustrating the liquid container including the display board portion removed with the slide-type detachable structure.

As illustrated in FIGS. 11 and 12, the liquid container 30 has a slide-type detachable structure 60 as a configuration in which the display board portion 35 is detachable. In the slide-type detachable structure 60, the display board portion 35 is provided to be detachable by being slid in a direction along the surface of the surface region 31B of the case 31. In the present embodiment, the display board portion 35 at an attachment position illustrated in FIGS. 2 and 3 is removed from the surface region 31B by being slid in a first direction (Z direction) to become a state as illustrated in FIG. 11, and then slid in a second direction (X direction) to become a state as illustrated in FIG. 12. In this way, the display board portion 35 is attached and detached by being slid in a plurality of directions including the first direction and the second direction. The example illustrated in FIGS. 11, 12, and the like is an example of the detachable structure 60 in which the display board portion 35 is attached and detached by two-direction sliding movement, but the detachable structure 60 may have a configuration in which multi-direction sliding movement in which the display board portion 35 is slid in three directions is performed.

The display board portion 35 of the present embodiment is attached and detached by multi-direction sliding movement including first sliding movement in which the display board portion 35 is moved in the first direction (Z direction) as illustrated in FIG. 11, and second sliding movement in which the display board portion 35 is moved in the second direction (X direction) as illustrated in FIG. 12.

Figure 13:
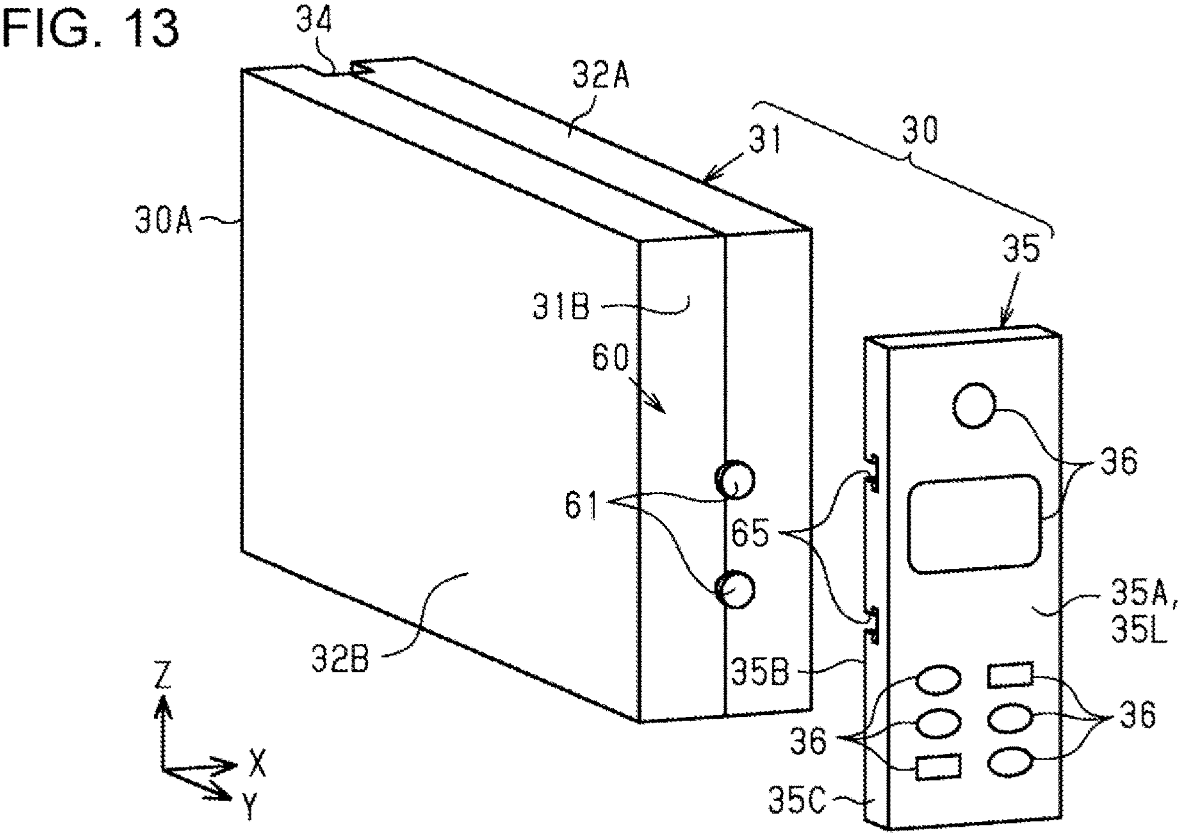
FIG. 13 is a perspective view illustrating the liquid container including the display board portion provided so as to be detachable with the slide-type detachable structure.
Figure 14:
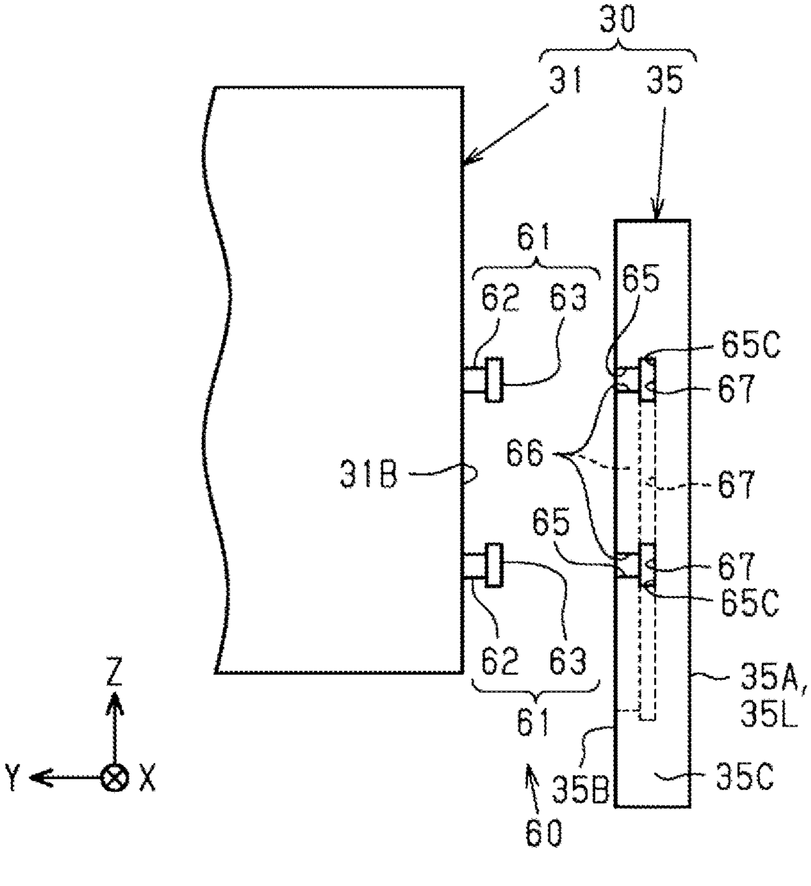
FIG. 14 is an exploded side view illustrating the display board portion and a case having the slide-type detachable structure.
Figure 16:
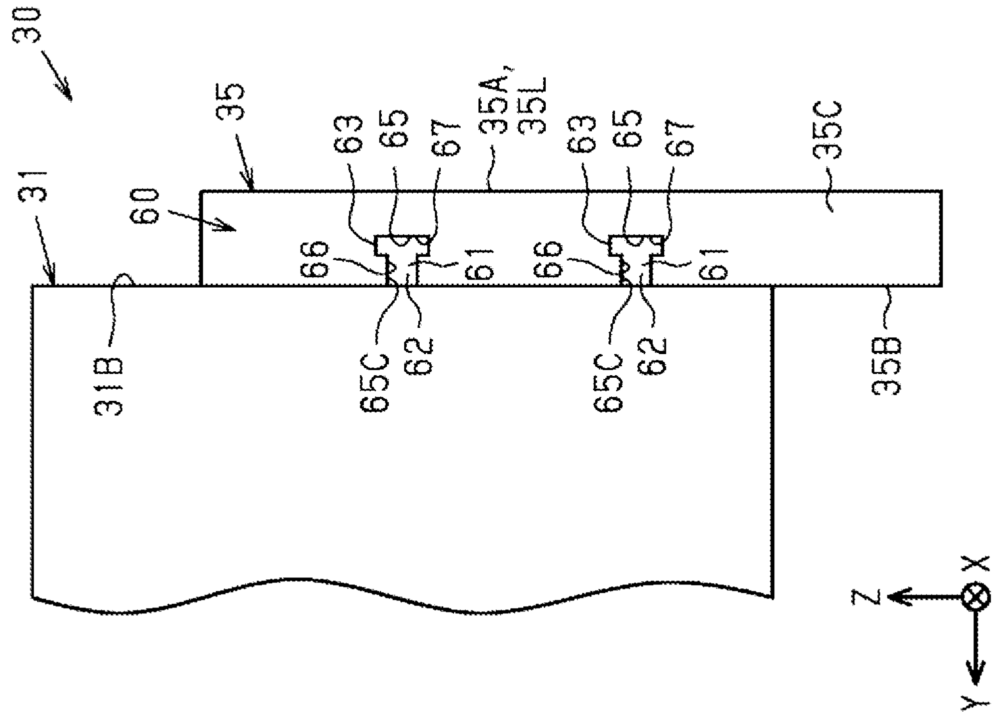
FIG. 16 is a side view illustrating the case and the display board portion engaged with each other by the slide-type detachable structure.

Next, the slide-type detachable structure will be described with reference to FIGS. 13 to 16. As illustrated in FIGS. 13 and 14, a plurality of guide pins 61 protrude from the surface region 31B. As illustrated in FIG. 14, the guide pin 61 includes a shaft portion 62 and a head portion 63, the head portion 63 being a large diameter portion formed at a tip of the shaft portion 62 and having a larger diameter than the shaft portion 62. The head portion 63 is, for example, a thin cylinder having a larger diameter than the shaft portion 62.

Figure 15:
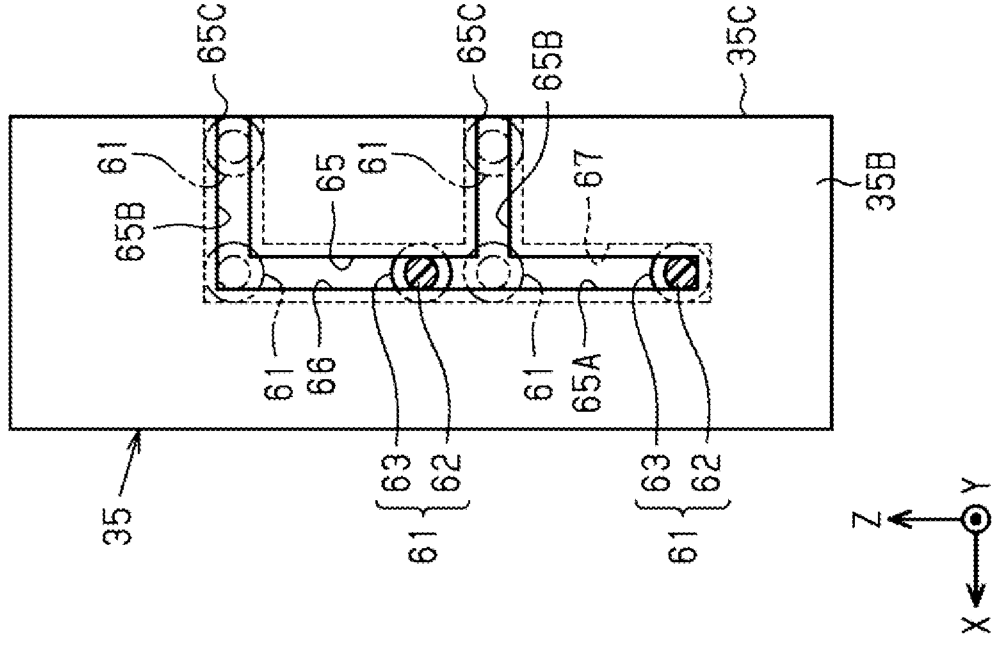
FIG. 15 is a bottom view illustrating a back surface of the display board portion having the slide-type detachable structure.

As illustrated in FIGS. 13 to 15, a guide groove 65 into which the guide pin 61 can be inserted is provided in a back surface of the display board portion 35. The guide groove 65 has a first insertion portion 66 into which the shaft portion 62 of the guide pin 61 is inserted, and a second insertion portion 67 into which the head portion 63 of the guide pin 61 is inserted.

As illustrated in FIG. 15, the guide groove 65 is formed as an F-shaped path as illustrated in FIG. 15 through which two guide pins 61 can be inserted. The guide groove 65 has a first guide groove portion 65A extending in the first direction (Z direction) and second guide groove portions 65B extending in the second direction (X direction).

The guide pin 61 separated from the guide groove 65 as illustrated in FIG. 14 is inserted by being slid from a substantially T-shaped opening 65C (see FIGS. 15 and 16) formed in a side surface 35C of the display board portion 35 in the X direction. That is, when the display board portion 35 is moved in the −X direction with respect to the surface region 31B, two guide pins 61 are inserted into the second guide groove portions 65B of the guide groove 65. The two guide pins 61 are moved along the second guide groove portions 65B until the guide pins 61 reach the first guide groove portion 65A. Further, the two guide pins 61 are moved in the −Z direction along the first guide groove portion 65A by moving the display board portion 35 in the +Z direction with respect to the surface region 31B. The two guide pins 61 are locked to locking recesses (not illustrated) at −Z direction end portions of the first guide groove portion 65A. The locking recess may be a recess formed in a direction in which the first guide groove portion 65A is further bent, or a recess that has a C-shaped cross section and can be fitted onto the shaft portion 62 of the guide pin 61. The guide pin 61 is configured to be unlocked from the locking recess when a predetermined force or more is applied to the display board portion 35 in a predetermined direction in which the guide pin 61 is pulled out from the locking recess.

When disposing of the liquid container 30, the display board portion 35 is slid in two directions, the Z direction and the X direction, with respect to the guide pin 61 along a path opposite to a path along which the display board portion 35 is attached to the surface region 31B. That is, the multi-direction sliding movement of the display board portion 35 at the attachment position illustrated in FIGS. 2 and 3 is performed, the multi-direction sliding movement including the first sliding movement in which the display board portion 35 is moved in the first direction (Z direction) as illustrated in FIG. 11, and the second sliding movement in which the display board portion 35 is moved in the second direction (X direction) as illustrated in FIG. 12. Thereby, the display board portion 35 is removed from the surface region 31B of the case 31 or the case body 32.

According to the second embodiment, the effects (1-1) to (1-8) and (1-10) of the first embodiment can be obtained in a similar way, and the following effects can also be obtained.

(2-1) The display board portion 35 is provided to be detachable by being slid in the direction along the surface of the surface region 31B of the case 31. According to this configuration, since it is necessary to slide the display board portion 35 in the direction along the surface region 31B of the case 31 to attach or detach the display board portion 35, it is easy for the user to avoid removing the display board portion 35.

Note that modifications of the above-described embodiments, such as the following modifications, can be made. Moreover, one which is obtained by appropriately combining the above-described embodiments and the following modifications can be another modification, or one which is obtained by appropriately combining the following modifications can also be another modification.

Figure 17:
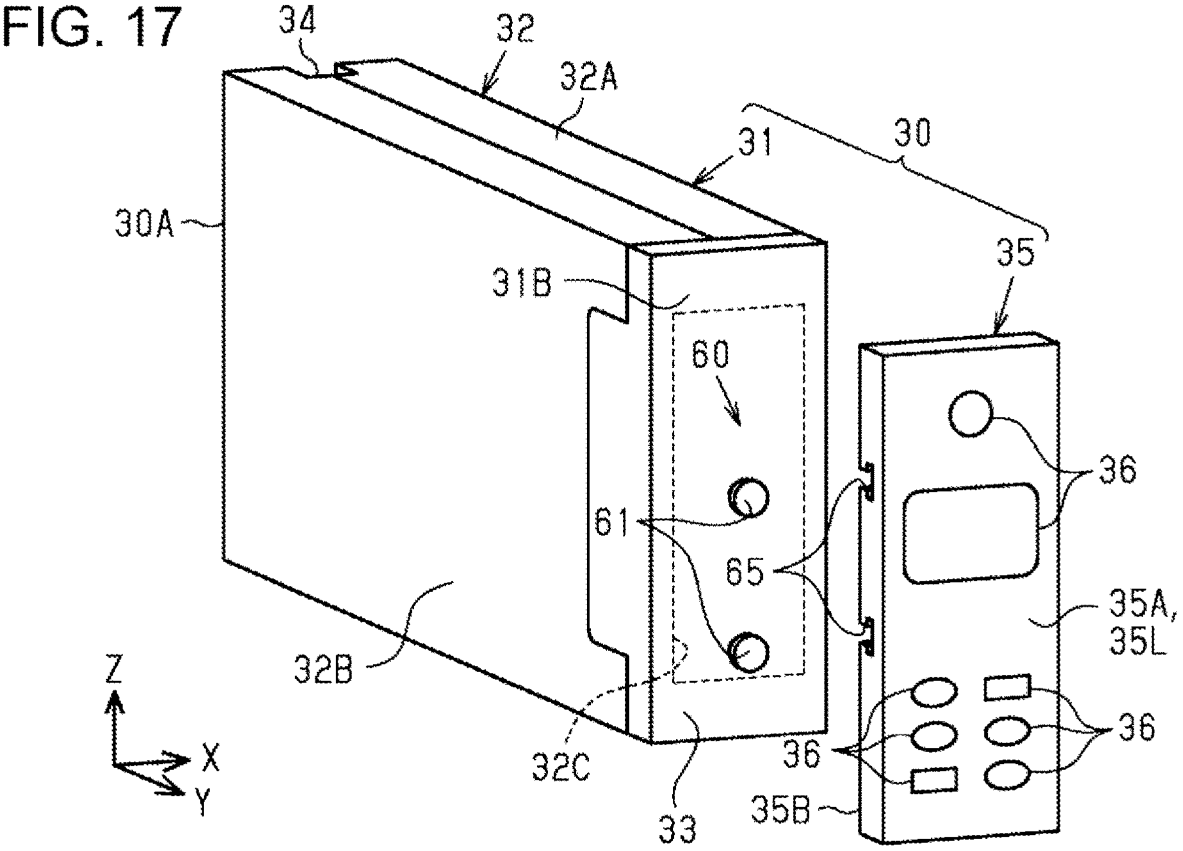
FIG. 17 is an exploded perspective view illustrating a liquid container according to a modification.

The display board portion 35 may be detachably provided on the lid member 33. As illustrated in FIG. 17, the display board portion 35 is detachably provided on the surface region 31B which is the surface of the lid member 33 included in the case 31. The case 31 includes the case body 32 having a bottomed rectangular cylindrical shape and having the opening 32C at one end, and the lid member 33 attached to the case body 32 so as to close the opening 32C. The display board portion 35 is a separate member from the constituent member of the case 31. The case body 32 includes the pair of case members 32A and 32B coupled to each other in a state in which the liquid containing body 40 is interposed therebetween. The case body 32 has the opening 32C (see FIG. 19) at the end portion opposite to the mounting surface 30A. According to this configuration, the lid member 33 that closes the opening 32C is attached to the end portion of the case body 32 opposite to the mounting surface 30A, and thus, the lid member 33 can also serve as the display board portion 35. Therefore, it is possible to increase the proportion of the portion that can be disposed of as a valuable resource while reducing the workload at the time of disposal without increasing the number of components included in the liquid container 30. Since the display board portion 35 is a separate member from the constituent member of the case 31, the number of components increases, but it is possible to increase the proportion of the portion that can be disposed of as a valuable resource while reducing the workload at the time of disposal.

Figure 18:
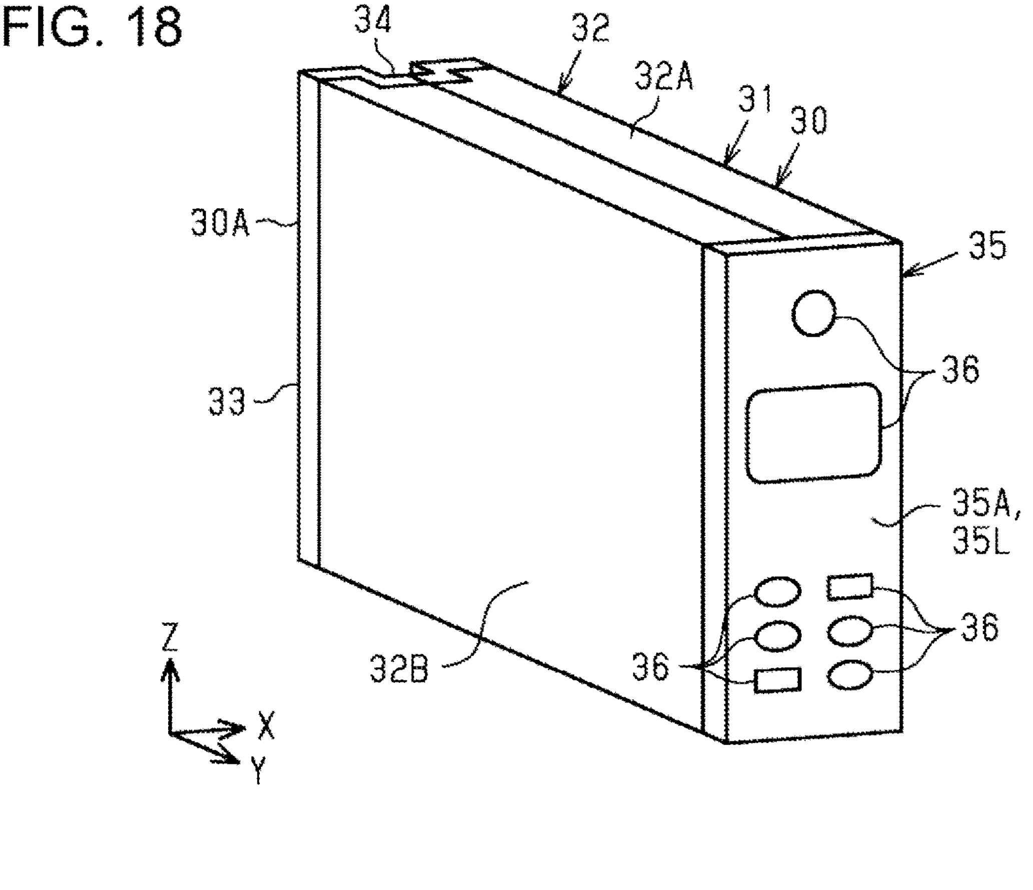
FIG. 18 is a perspective view illustrating a liquid container according to a modification different from FIG. 17.

As illustrated in FIG. 18, the lid member 33 may be attached to the mounting surface 30A side of the case 31. The case 31 includes the case body 32 having a bottomed rectangular cylindrical shape and having the opening 32C at one end, and the lid member 33 attached to the case body 32 so as to close the opening 32C. The case body 32 is formed by coupling the pair of case members 32A and 32B in a state in which the liquid containing body 40 (see FIG. 4) is interposed therebetween. The lid member 33 includes the mounting surface 30A. That is, a back surface of the lid member 33 is the mounting surface 30A. The display board portion 35 is detachably provided on the end portion of the case body 32 that is opposite to the mounting surface 30A. The display board portion 35 is a separate member from the constituent member of the case 31. According to this configuration, since the display board portion 35 is a separate member from the constituent member of the case 31, the number of components increases, but it is possible to increase the proportion of the portion of the case 31 that can be disposed of as a valuable resource while reducing the workload at the time of disposal.

Figure 19:
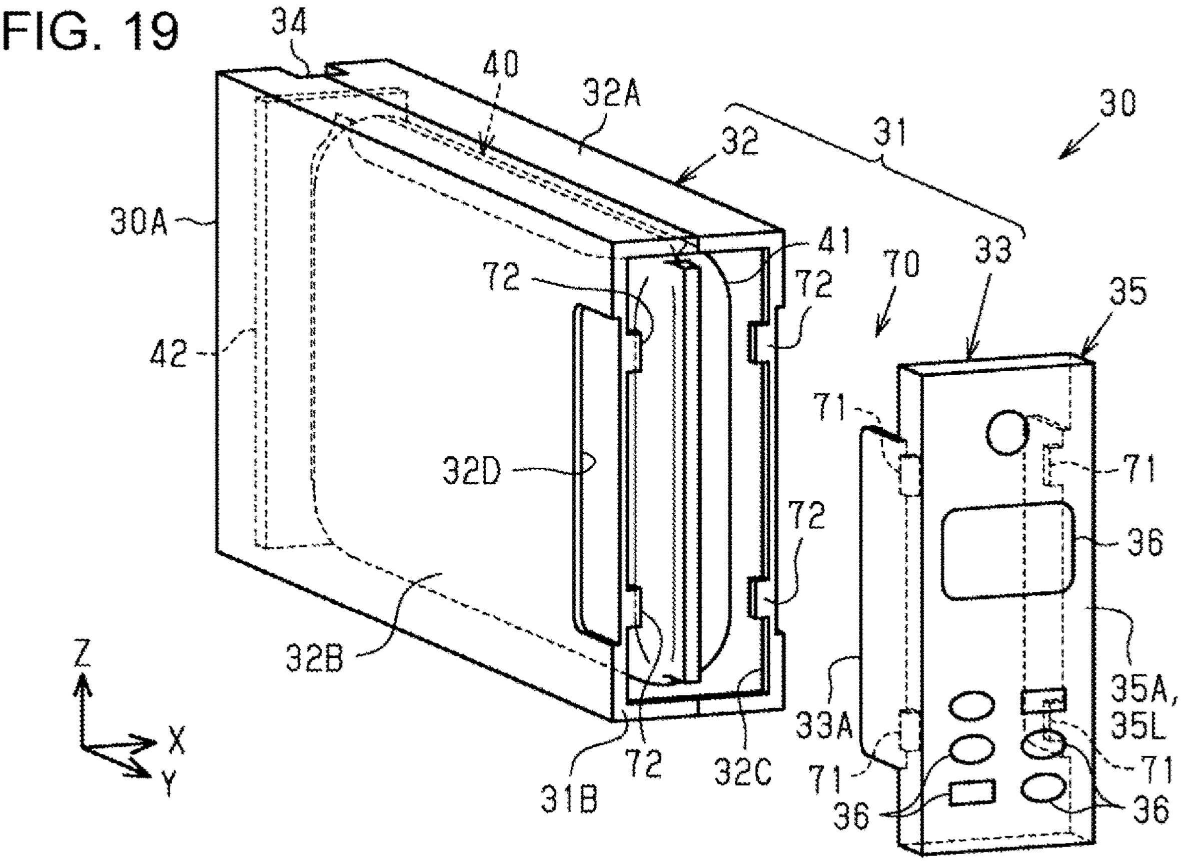
FIG. 19 is an exploded perspective view illustrating a liquid container according to a modification different from FIG. 18.

The locking structure 50 that detachably locks the display board portion 35 to the surface region 31B is not limited to the structure including the locking pin 51 and the hole 55. For example, as illustrated in FIG. 19, a locking structure 70 may include a locking claw 71 provided on any one of the surface region 31B and the display board portion 35, and a locked portion 72 provided on the other one of the surface region 31B and the display board portion 35. In the example illustrated in FIG. 19, the display board portion 35 also serves as the lid member 33. A pair of extensions 33A of the lid member 33 are assembled to be fitted into recesses 32D formed in a pair of side surfaces between which the opening 32C of the case body 32 is interposed. The display board portion 35 may be separate from the case 31. In the example illustrated in FIG. 19, the locking claw 71 is provided on the display board portion 35, and the locked portion 72 is provided on the surface region 31B, but the reverse configuration is also acceptable.

Figure 20:
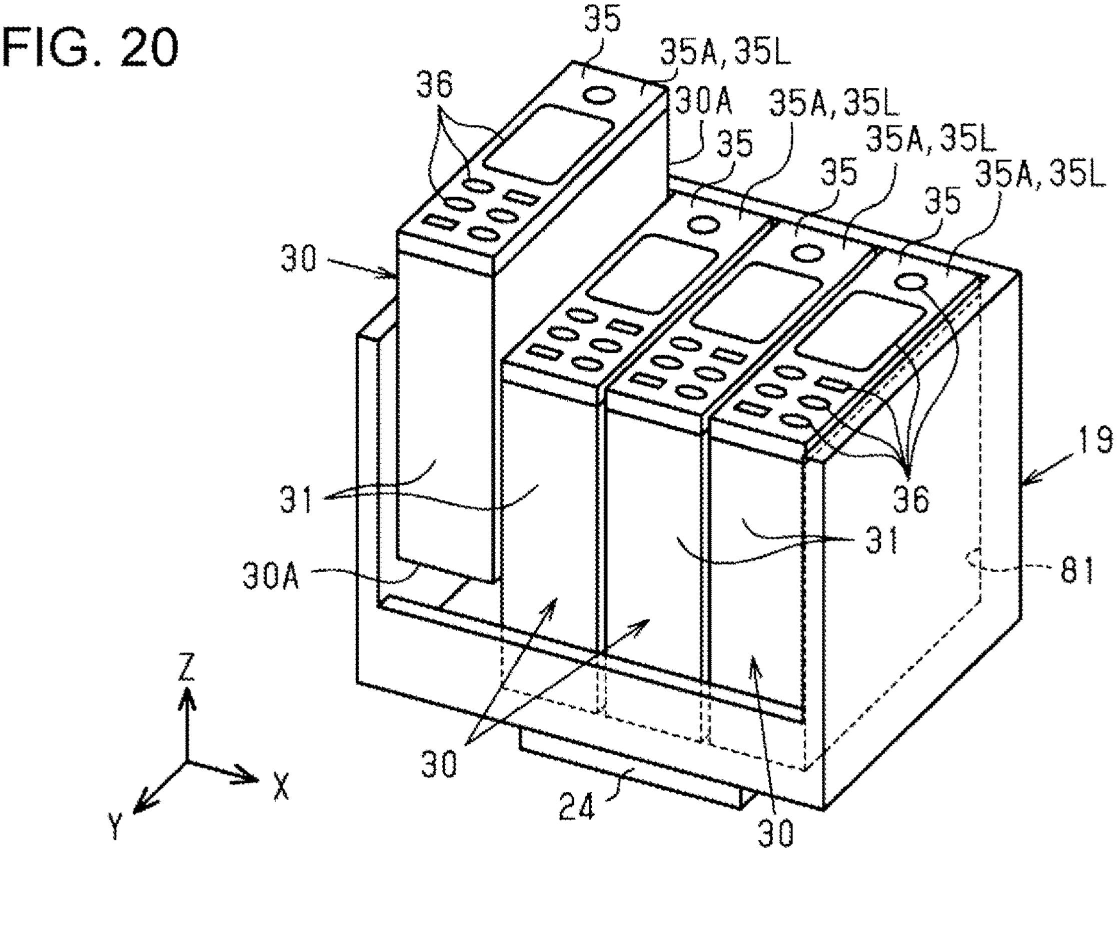
FIG. 20 is a perspective view illustrating a liquid container mounted on a mounting portion on a carriage according to a modification.

The liquid ejecting device 11 is not limited to an off-carriage type in which the liquid container 30 is mounted on the mounting portion 25 fixed at a predetermined position within the housing 12, and may be an on-carriage type in which the liquid container 30 is mounted on the carriage 19. That is, the liquid container 30 is not limited to being used in the mounting portion 25 of the off-carriage type, and may be mounted on a mounting portion 81 of the on-carriage type mounted on the carriage 19. As illustrated in FIG. 20, the carriage 19 includes the mounting portion 81. The liquid container 30 is detachably mounted on the mounting portion 81 of the carriage 19. The liquid container 30 is attached to and detached from the mounting portion 81 by being moved in the Y direction (+Y direction and −Y direction). Two surfaces of the liquid container 30, a lower surface and an inner surface, may be the mounting surfaces 30A. For example, the lower surface of the liquid container 30 is the mounting surface 30A on which the supply portion 43 (see FIG. 3) is provided, and the inner surface is the mounting surface 30A on which the substrate 34 (see FIG. 3) is provided. The liquid container 30 includes the detachable display board portion 35 on an upper surface opposite to the mounting surface 30A which is the lower surface on which the supply portion 43 is provided. The upper surface of the liquid container 30 on which the display board portion 35 is positioned is a surface that is visible to the user when the user opens the cover (not illustrated) of the liquid ejecting device 11. The other configurations of the liquid container 30 are basically similar to those described in the first embodiment, the second embodiment, and the modifications. In other words, the display board portion 35 may also serve as the lid member 33 (FIGS. 5, 19, and the like), or may be a separate member from the case 31 (FIGS. 6, 13, 17, and the like). The identification information 36 regarding the liquid container 30 is gathered on the display board portion 35. In particular, all the pieces of identification information 36 may be displayed on the display board portion 35. The mounting surface 30A may be only the lower surface or only the inner surface of the liquid container 30. When the mounting surface 30A is only the inner surface, the display board portion 35 positioned on the upper surface of the liquid container 30 is provided on a different surface from the mounting surface 30A, the different surface being not opposite to the mounting surface 30A. In other words, the display board portion 35 is provided on a surface (upper surface) of the case 31 that is adjacent to the mounting surface 30A and is visible to the user when the cover of the liquid ejecting device 11 is opened. With the configuration of the on-carriage type, it is also possible to increase a proportion of a component that can be disposed of as a valuable resource while reducing the workload required for recycling at the time of disposal. In addition, the same effects as those of the embodiments and modifications described above can be obtained.

Not all the pieces of identification information 36 need to be displayed on the display board portion 35. In short, it is sufficient that the identification information 36 is gathered on the display board portion 35. For example, a small proportion of the identification information 36 (for example, 20% or less in terms of area) may be displayed on the case 31. In other words, the gathering of the identification information 36 only requires that 80% or more of the identification information 36 is displayed on the display board portion 35 in terms of area. When there is less the identification information 36 displayed on the case 31, the workload such as peeling off the label or erasing printed information is reduced, which makes it easier to increase the proportion of the components of the case 31 that can be disposed of as a valuable resource.

The case 31 of the liquid container 30 may have a configuration in which the lid members 33 are attached to both end portions of the case body 32. In this case, the lid member 33 on a side opposite to the mounting surface 30A may also serve as the display board portion 35, or the display board portion 35 may be detachably provided on the surface region 31B that is a bottom surface of the lid member 33. In the latter case, the detachable structure of the display board portion 35 may be either the locking structure 50 or the slide-type detachable structure 60.

The liquid container is not limited to the liquid container 30 that contains the liquid to be supplied to the ejection head 24. The liquid container may be a liquid container such as a waste liquid tank that contains liquid discharged from the ejection head 24 for maintenance purposes as waste liquid (for example, waste ink). In this case, the identification information 36 may be displayed on the display board portion 35 of the liquid container 30. The identification information 36 may include waste liquid related information.

Only the case body 32 of the case 31 of the liquid container 30 may be reused, and the lid member 33 may be melted and used as a resin raw material. Since a proportion of a volume of the lid member 33 in the case 31 is small, it is possible to increase the proportion of the components of the liquid container 30 that can be disposed of as a valuable resource while reducing the workload at the time of disposal.

The liquid container 30 is not limited to a configuration in which the case 31 houses the liquid containing body 40 such as a liquid pack. For example, the case 31 may include a liquid storage chamber, and the liquid such as ink may be contained (stored) in the liquid storage chamber. In this case, a portion forming the liquid storage chamber in the case corresponds to the liquid containing body housed in the case.

Disposal of the liquid container 30 as a valuable resource is not limited to reusing as a component, and may include melting the components of the case 31 of the previously used liquid container 30 and reusing the melted component as a resin raw material. With this type of reuse, it is also possible to increase the proportion of the portion that can be disposed of as a valuable resource while reducing the workload such as peeling off the label from the component of the case 31 or erasing printed information at the time of disposal.

The detachable configuration of the display board portion 35 is not limited to the locking structure 50 or the slide-type detachable structure 60, and may be any other known locking structure or detachable structure. It is sufficient that the display board portion 35 can be removed relatively easily by the operator using a tool or jig during disposal when it is difficult for the user to remove the display board portion 35, or the display board portion 35 can be removed by an operation portion of an automatic machine performing a predetermined operation on the liquid container 30.

The medium M is not limited to paper, and may be a film formed of a synthetic resin, or a fabric such as cloth or non-woven fabric. Furthermore, the medium M may be a laminated medium including a synthetic resin layer and a metal layer, a foil formed of metal, or the like.

The liquid ejecting device 11 is not limited to an ink jet printer that performs printing on paper, and may also be a textile printing device that performs printing on a fabric or the like. Further, the liquid ejecting device 11 on which the liquid container 30 is mounted is not limited to the serial type liquid ejecting device 11, and may be a line printer or a lateral printer.

The liquid ejecting device 11 may be a liquid ejecting device that ejects liquid other than ink. A state of the liquid ejected in the form of minute droplets from the liquid ejecting device may include a granular state, a tear-like state, and a thread-like trailing state. It is sufficient that the liquid referred to here is any material as long as the liquid can be ejected from the liquid ejecting device. For example, it is sufficient that the liquid is a substance in a liquid phase, and the liquid may include fluids such as a liquid with a high or low viscosity, sol, gel water, other inorganic solvents, organic solvents, solutions, liquid resins, and liquid metals (molten metals). The liquid includes not only liquid as a state of a substance, but also a material in which particles of a functional material made of a solid substance such as pigments or metallic particles are dissolved in, dispersed in, or mixed with a solvent. Typical examples of the liquid include ink as described in the above embodiments and liquid crystal. Here, the ink includes general water-based inks and oil-based inks, and various other liquid compositions such as gel inks and hot-melt inks. Specific examples of the liquid ejecting device include a liquid crystal display, an electroluminescence (EL) display, a surface emitting display, and a device that ejects liquid containing a dispersed or dissolved material such as an electrode material or a coloring material used in manufacturing of a color filter or the like. The liquid ejecting device may be a device that ejects a bioorganic substance used for biochip production, a device that ejects liquid as a sample used as a precision pipette, a textile printing device, a microdispenser, or the like. The liquid ejecting device may be a device that ejects lubricating oil with pinpoint precision to a precision machine such as a watch or a camera, or a device that ejects, on a substrate, a transparent resin such as an ultraviolet curable resin for forming a micro hemispherical lens or an optical lens used in an optical communication element or the like. The liquid ejecting device may be a device that ejects an etchant such as an acid or alkali to etch a substrate or the like. The liquid container 30 may be mounted on this type of liquid ejecting device 11.

Hereinafter, the technical idea of the embodiments and the modifications described above will be described with the effects.

(A) A liquid container includes: a liquid containing body containing liquid; a case housing the liquid containing body; and a display board portion on which identification information regarding the liquid container is gathered and displayed, in which the case has a mounting surface from which a supply portion through which the liquid in the liquid containing body is supplied is exposed, and the display board portion is detachably provided on a surface region different from the mounting surface of the case.

According to this configuration, the identification information is gathered on the display board portion, and it is thus sufficient that the display board portion is removed from the case when disposing of the liquid container. In other words, it is possible to reduce the workload required at the time of disposal, such as peeling off the label from the case or erasing printed information. Therefore, it is possible to increase the proportion of the portion that can be disposed of as a valuable resource while reducing the workload required at the time of disposal during recycling. The display board portion may be disposed of, but when the display board portion is to be reused, it is sufficient that the recycled display board portion is simply attached to the surface region of the recycled case when recycling the liquid container. Therefore, it is possible to reduce the workload required for recycling, such as pasting the label displaying the identification information or recording (including engraving) the identification information. Therefore, it is possible to increase the proportion of the portion of the case of the liquid container that can be disposed of as a valuable resource while reducing the workload at the time of disposal.

(B) In the liquid container according to (A), all pieces of the identification information may be displayed on the display board portion. According to this configuration, all the pieces of identification information are displayed on the display board portion, so that the workload at the time of disposal can be further reduced, and the proportion of the portion of the case of the liquid container that can be disposed of as a valuable resource can be increased.

(C) In the liquid container according to (A) or (B), the display board portion may be at least a part of a lid member included in the case. According to this configuration, the lid member also serves as the display board portion, and it is thus possible to increase the proportion of the portion that can be disposed of as a valuable resource while reducing the workload at the time of disposal without increasing the number of components included in the liquid container.

(D) In the liquid container according to (C), the case may include a case body formed by coupling a pair of case members in a state in which the liquid containing body is interposed therebetween, having a bottomed rectangular cylindrical shape, and having an opening at an end portion opposite to the mounting surface, and the lid member attached to the case body so as to close the opening.

According to this configuration, the lid member is attached to the end portion of the case body opposite to the mounting surface, and thus, the lid member can also serve as the display board portion. Therefore, it is possible to increase the proportion of the portion that can be disposed of as a valuable resource while reducing the workload at the time of disposal without increasing the number of components included in the liquid container.

(E) In the liquid container according to (A) or (B), the display board portion may be a separate member from a constituent member of the case. According to this configuration, since the display board portion is a separate member from the constituent member of the case, the number of components increases, but it is possible to increase the proportion of the portion that can be disposed of as a valuable resource while reducing the workload at the time of disposal.

(F) In the liquid container according to (E), the case may include a case body formed by coupling a pair of case members in a state in which the liquid containing body is interposed therebetween, having a bottomed rectangular cylindrical shape, and having an opening at one end, and a lid member attached to the case body so as to close the opening, the lid member may include the mounting surface, and the display board portion may be detachably provided at an end portion of the case body that is opposite to the mounting surface.

According to this configuration, the display board portion is detachably provided on the surface region opposite to the lid member disposed on the mounting surface side of the case body, and thus, the number of parts increases, but it is possible to increase the proportion of the portion that can be disposed of as a valuable resource while reducing the workload at the time of disposal.

(G) In the liquid container according to any one of (A) to (F), a label displaying the identification information may be pasted to the display board portion. With this configuration, the label displaying the identification information is pasted to the display board portion, and thus, it is possible to reduce the workload of peeling of the label by discarding the display board portion when disposing of the liquid container. On the other hand, when the display board portion is used repeatedly, it is possible to reduce the workload required for recycling, such as pasting the label when recycling the liquid container. Therefore, it is possible to increase the proportion of the portion of the case of the liquid container that can be disposed of as a valuable resource while reducing the workload.

(H) In the liquid container according to any one of (A) to (F), the identification information may be directly recorded on the display board portion. According to this configuration, since the identification information is directly recorded on the display board portion, when the display board portion is discarded when disposing of the liquid container, the workload of erasing the directly recorded identification information can be reduced. On the other hand, when the display board portion is used repeatedly, it is possible to reduce the workload required for recycling, such as directly recording the identification information when recycling the liquid container. Therefore, it is possible to increase the proportion of the portion of the case of the liquid container that can be disposed of as a valuable resource while reducing the workload.

(I) In the liquid container according to any one of (A) to (H), the display board portion may be detachably locked to the surface region of the case. According to this configuration, the display board portion is detachably provided by being locked to the surface region of the case, and thus, it is relatively easy to attach and detach the display board portion when manufacturing, recycling, and disposing of the liquid container. Further, it is easy for the user to avoid removing the display board portion.

(J) In the liquid container according to any one of (A) to (H), the display board portion may be provided so as to be detachable by being slid in a direction along a surface of the surface region of the case. According to this configuration, since it is necessary to slide the display board portion in the direction along the surface region of the case to attach or detach the display board portion, it is easy for the user to avoid removing the display board portion.

(K) A method for reusing the liquid container according to any one of (A) to (J) includes: collecting the liquid container previously used in which the liquid in the liquid containing body housed in the case of which the display board portion is detachably provided on the surface region different from the mounting surface was used; removing the display board portion from the liquid container previously used; and reusing at least some components of the case from which the display board portion was removed and recycling a liquid container by detachably providing a display board portion that is new or recycled on a surface region of a case recycled by reusing the components. With this method, it is possible to increase the proportion of the portion of the case that can be disposed of as a valuable resource while reducing the workload required for recycling at the time of disposal.

What is claimed is:

1. A liquid container comprising:
a liquid containing body containing liquid;
a case housing the liquid containing body; and
a display board portion on which identification information regarding the liquid container is gathered and displayed, wherein
the case has a mounting surface from which a supply portion through which the liquid in the liquid containing body is supplied is exposed, and
the display board portion is detachably provided on a surface region different from the mounting surface of the case.

2. The liquid container according to claim 1, wherein all pieces of the identification information are displayed on the display board portion.

3. The liquid container according to claim 1, wherein the display board portion is at least a part of a lid member included in the case.

4. The liquid container according to claim 3, wherein the case includes a case body formed by coupling a pair of case members in a state in which the liquid containing body is interposed between the pair of case members, having a bottomed rectangular cylindrical shape, and having an opening at an end portion opposite to the mounting surface, and the lid member attached to the case body so as to close the opening.

5. The liquid container according to claim 1, wherein the display board portion is a separate member from a constituent member of the case.

6. The liquid container according to claim 5, wherein
the case includes a case body formed by coupling a pair of case members in a state in which the liquid containing body is interposed between the pair of case members, having a bottomed rectangular cylindrical shape, and having an opening at one end, and a lid member attached to the case body so as to close the opening,
the lid member includes the mounting surface, and
the display board portion is detachably provided at an end portion of the case body that is opposite to the mounting surface.

7. The liquid container according to claim 1, wherein a label displaying the identification information is pasted to the display board portion.

8. The liquid container according to claim 1, wherein the identification information is directly recorded on the display board portion.

9. The liquid container according to claim 1, wherein the display board portion is detachably locked to the surface region of the case.

10. The liquid container according to claim 1, wherein the display board portion is provided so as to be detachable by being slid in a direction along a surface of the surface region of the case.

11. A method for reusing the liquid container according to claim 1, the method comprising:
collecting the liquid container previously used in which the liquid in the liquid containing body housed in the case of which the display board portion is detachably provided on the surface region different from the mounting surface was used;
removing the display board portion from the liquid container previously used; and
reusing at least some components of the case from which the display board portion was removed and recycling a liquid container by detachably providing a display board portion that is new or recycled on a surface region of a case recycled by reusing the components.

* * * * *